Dec. 17, 1957     L. ROSSETTO ET AL     2,816,609
TAPE PERFORATING MACHINE
Filed April 12, 1954                            15 Sheets-Sheet 1
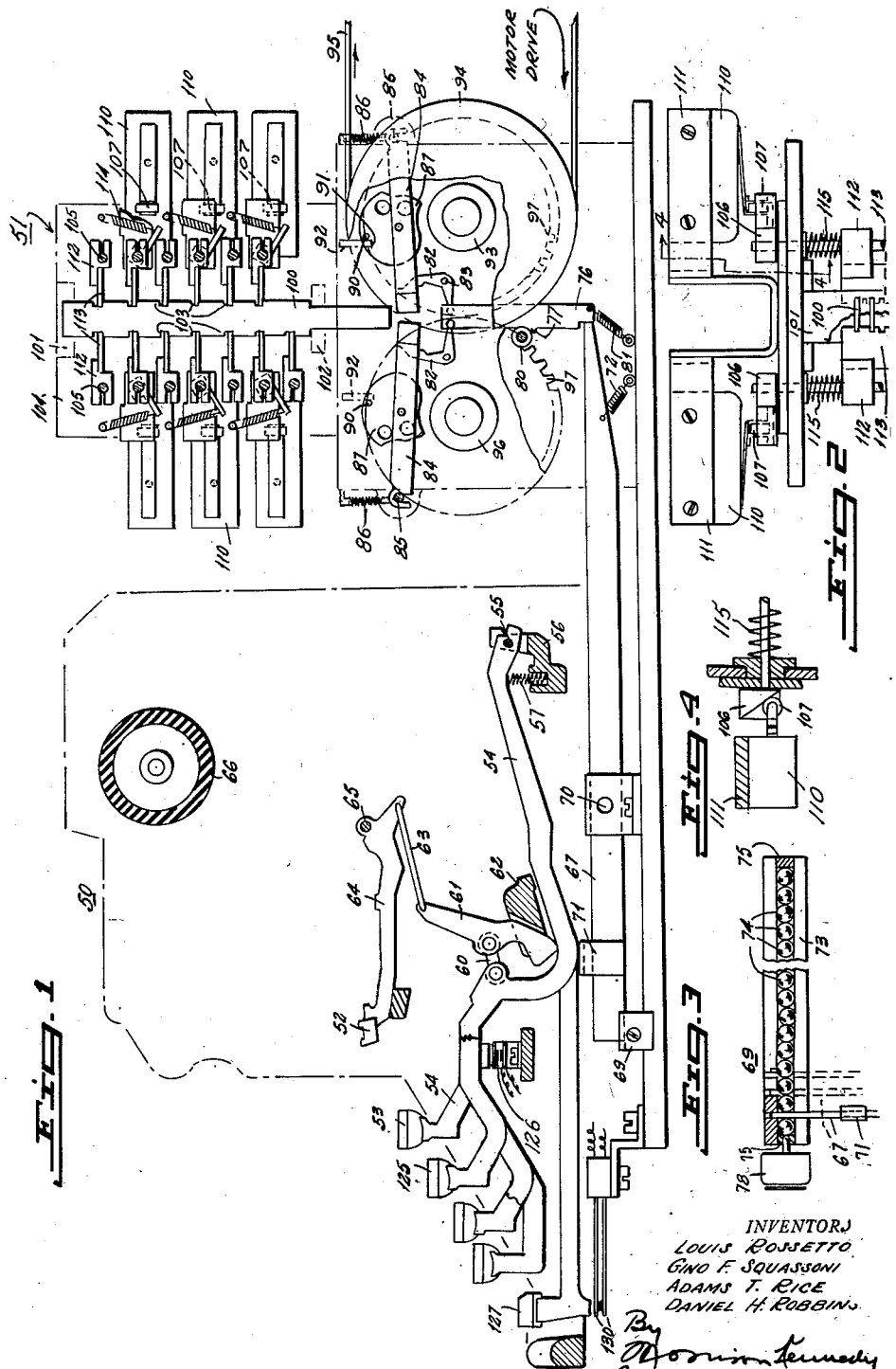
INVENTORS
LOUIS ROSSETTO
GINO F. SQUASSONI
ADAMS T. RICE
DANIEL H. ROBBINS
By
ATTORNEYS Dec. 17, 1957 L. ROSSETTO ET AL 2,816,609
TAPE PERFORATING MACHINE
Filed April 12, 1954 15 Sheets-Sheet 2
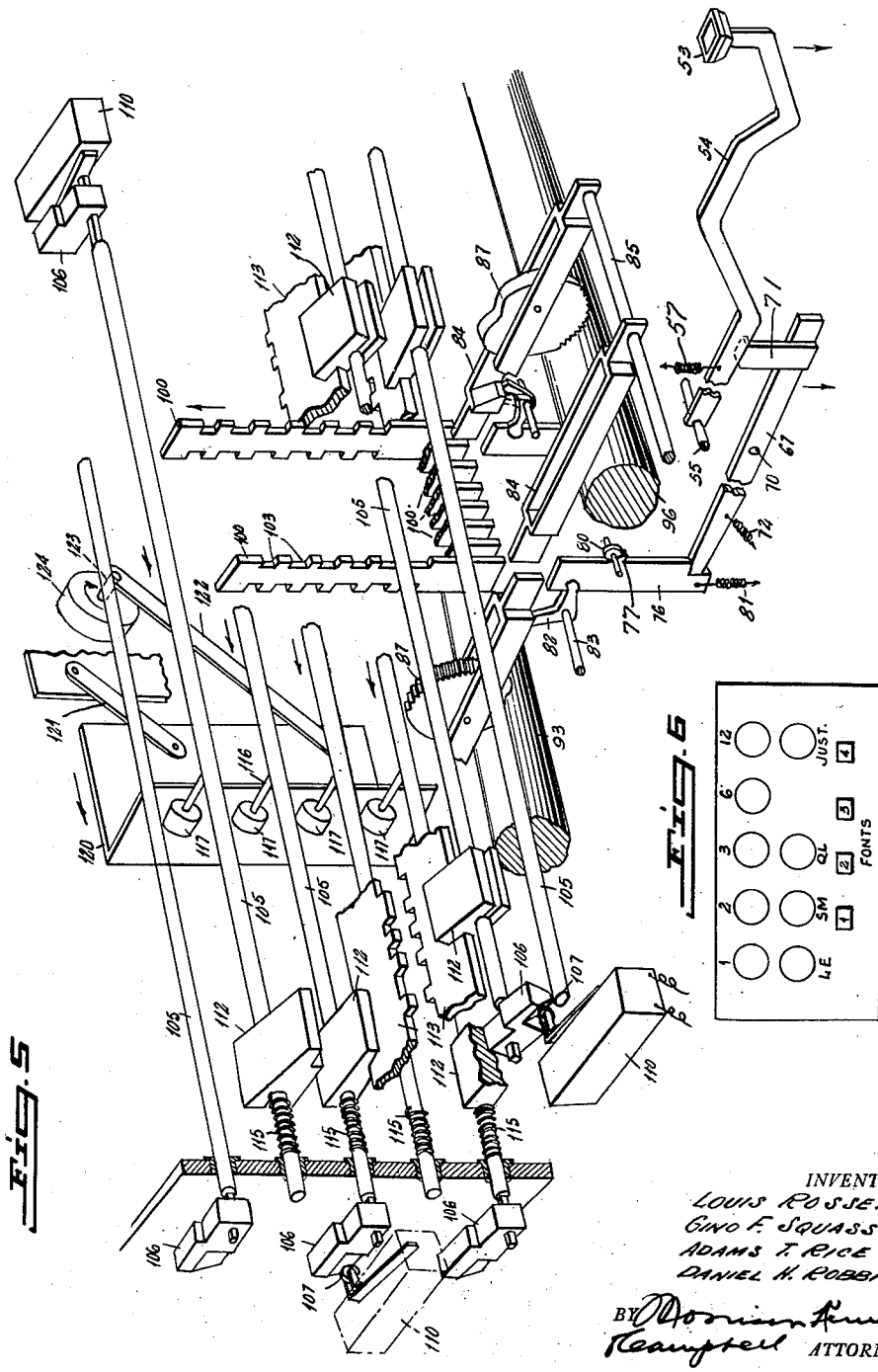
INVENTORS
LOUIS ROSSETTO
GINO F. SQUASSONI
ADAMS T. RICE
DANIEL H. ROBBINS
BY
ATTORNEYS

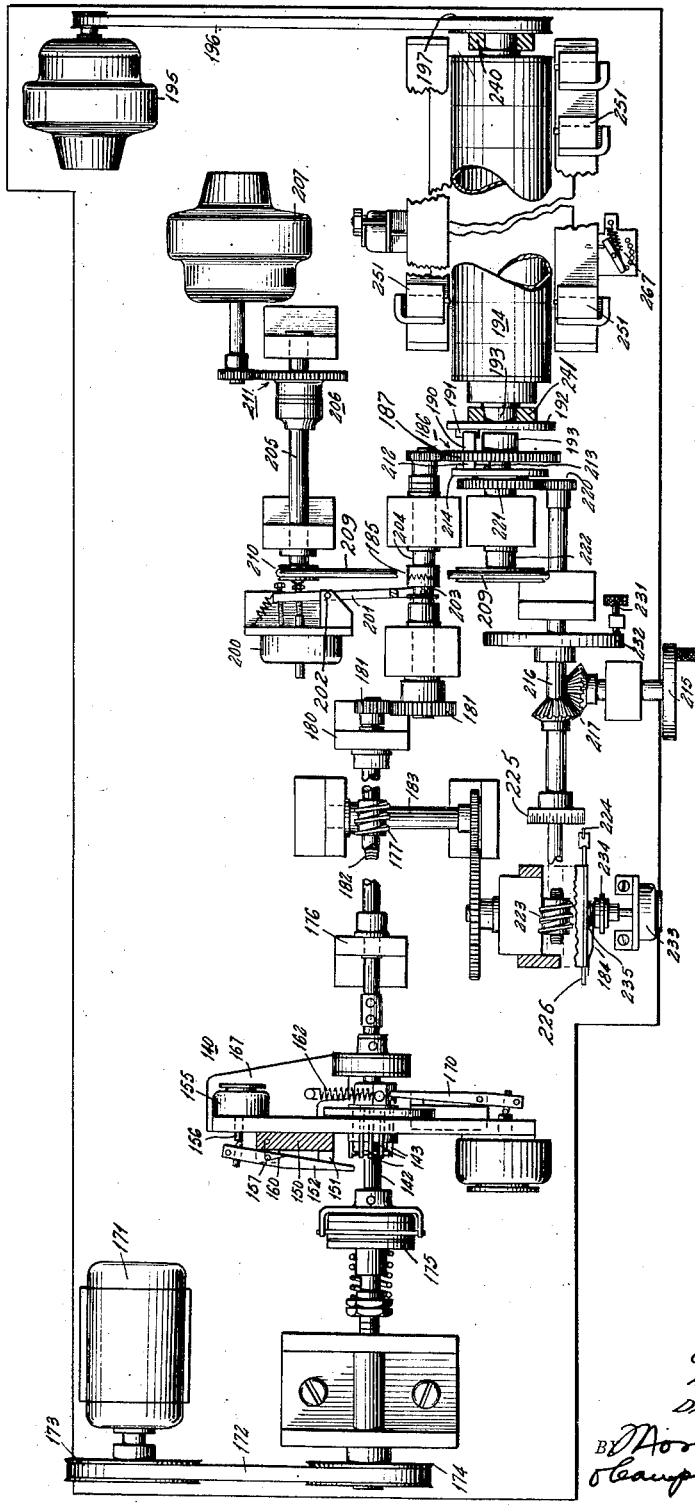

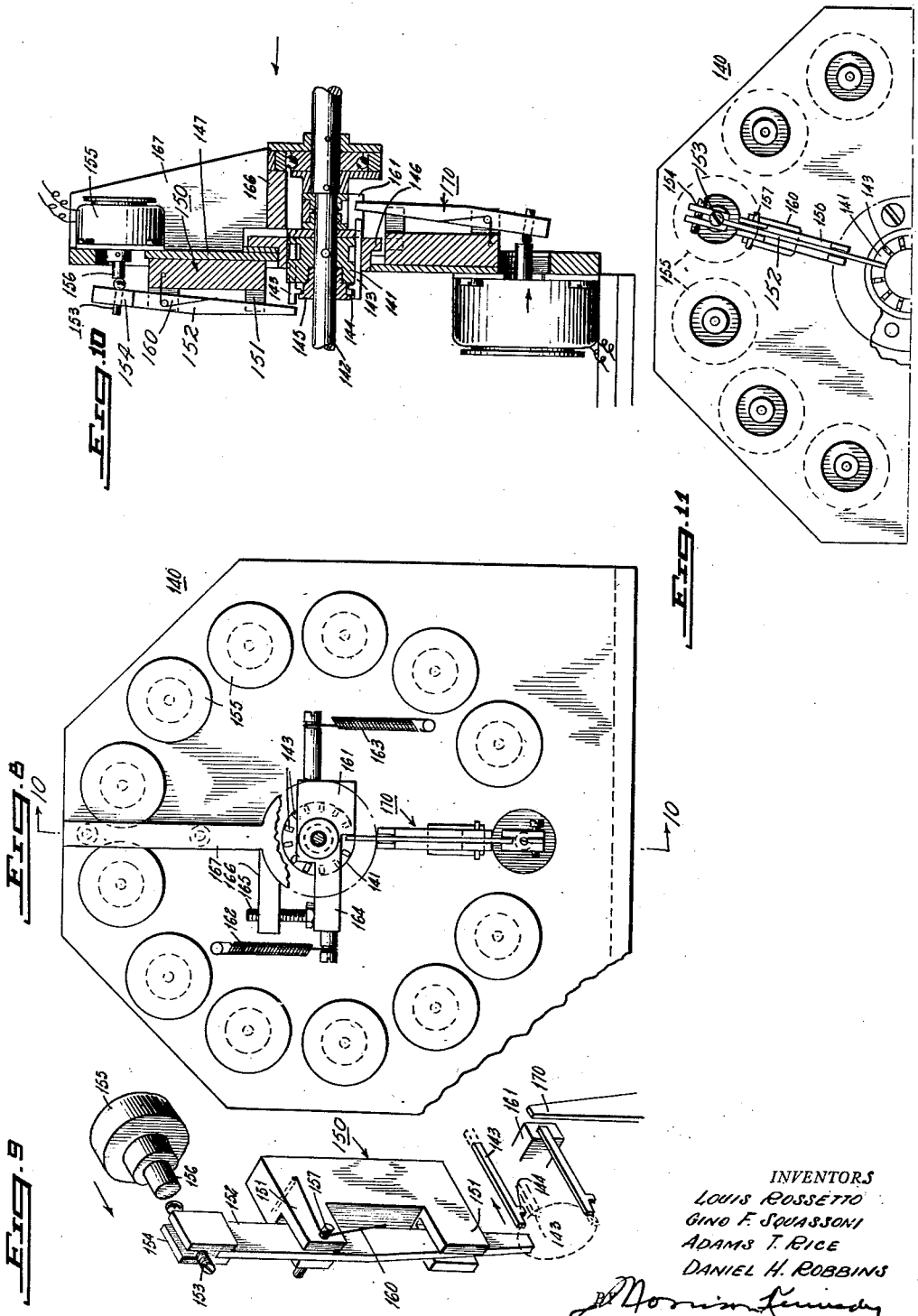

Dec. 17, 1957    L. ROSSETTO ET AL    2,816,609
TAPE PERFORATING MACHINE
Filed April 12, 1954    15 Sheets-Sheet 5
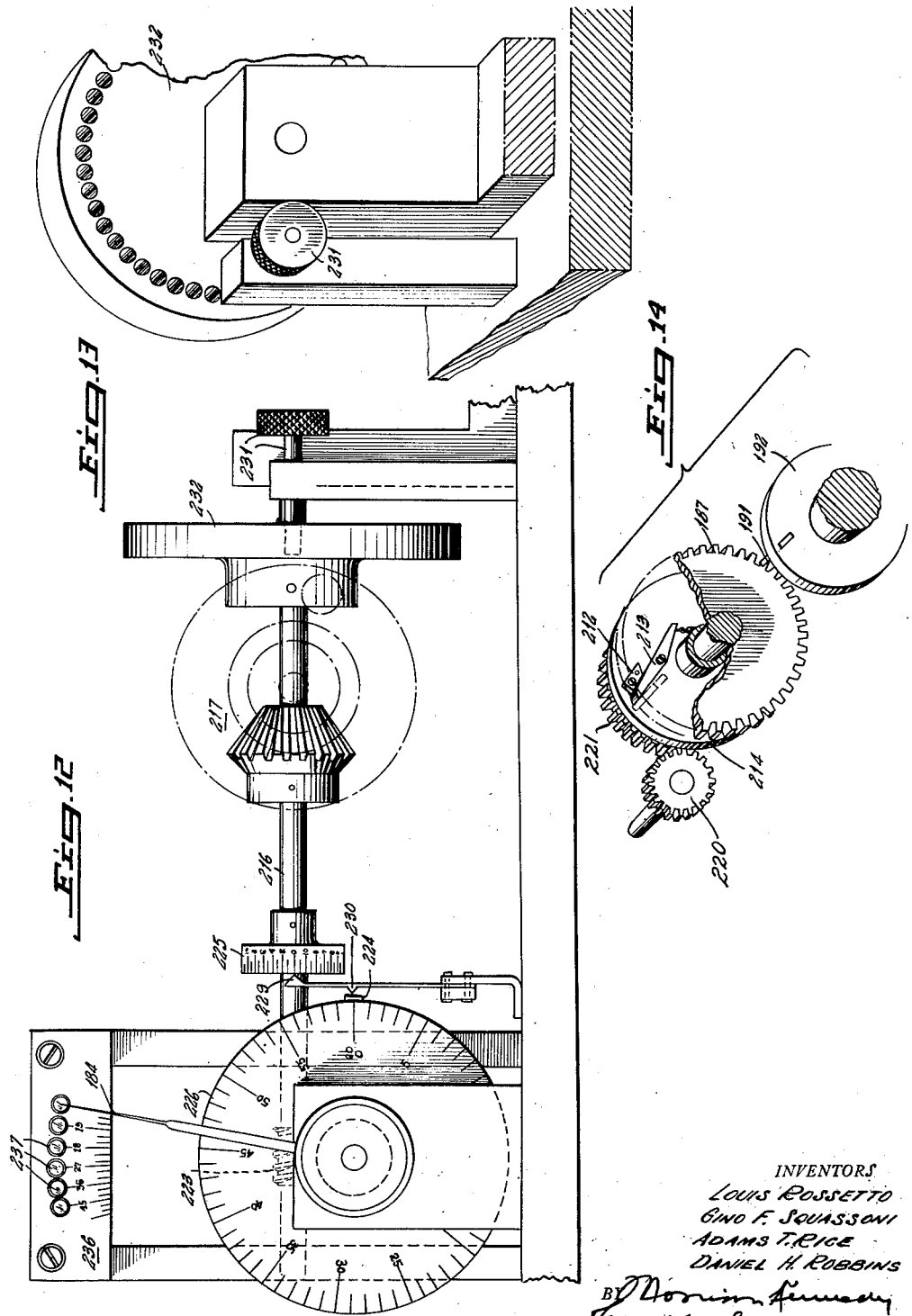
INVENTORS
LOUIS ROSSETTO
GINO F. SQUASSONI
ADAMS T. RICE
DANIEL H. ROBBINS
BY
ATTORNEYS

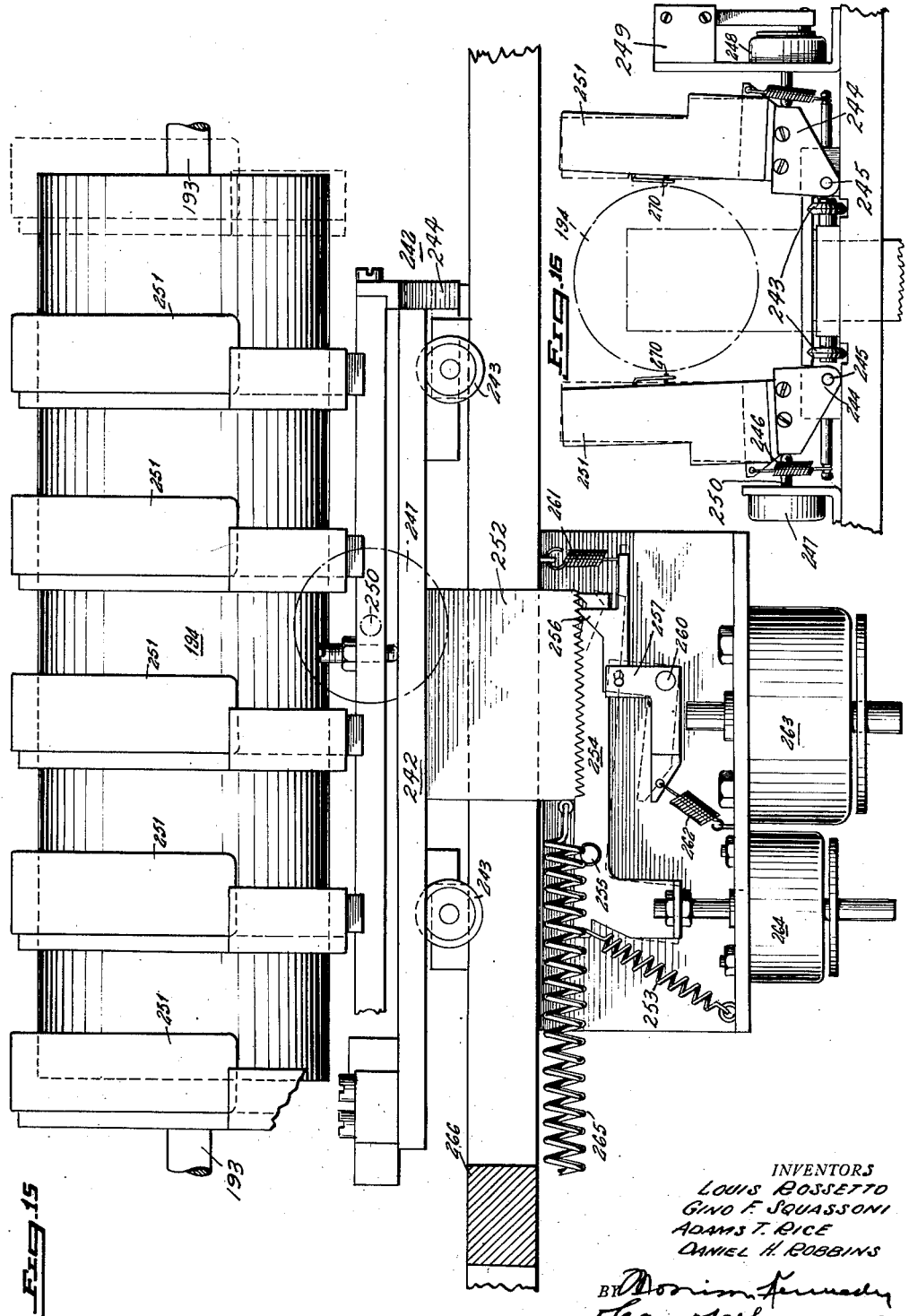

Dec. 17, 1957  L. ROSSETTO ET AL  2,816,609
TAPE PERFORATING MACHINE
Filed April 12, 1954  15 Sheets-Sheet 7

INVENTORS
LOUIS ROSSETTO
GINO F. SQUASSONI
ADAMS T. RICE
DANIEL H. ROBBINS

BY
ATTORNEYS

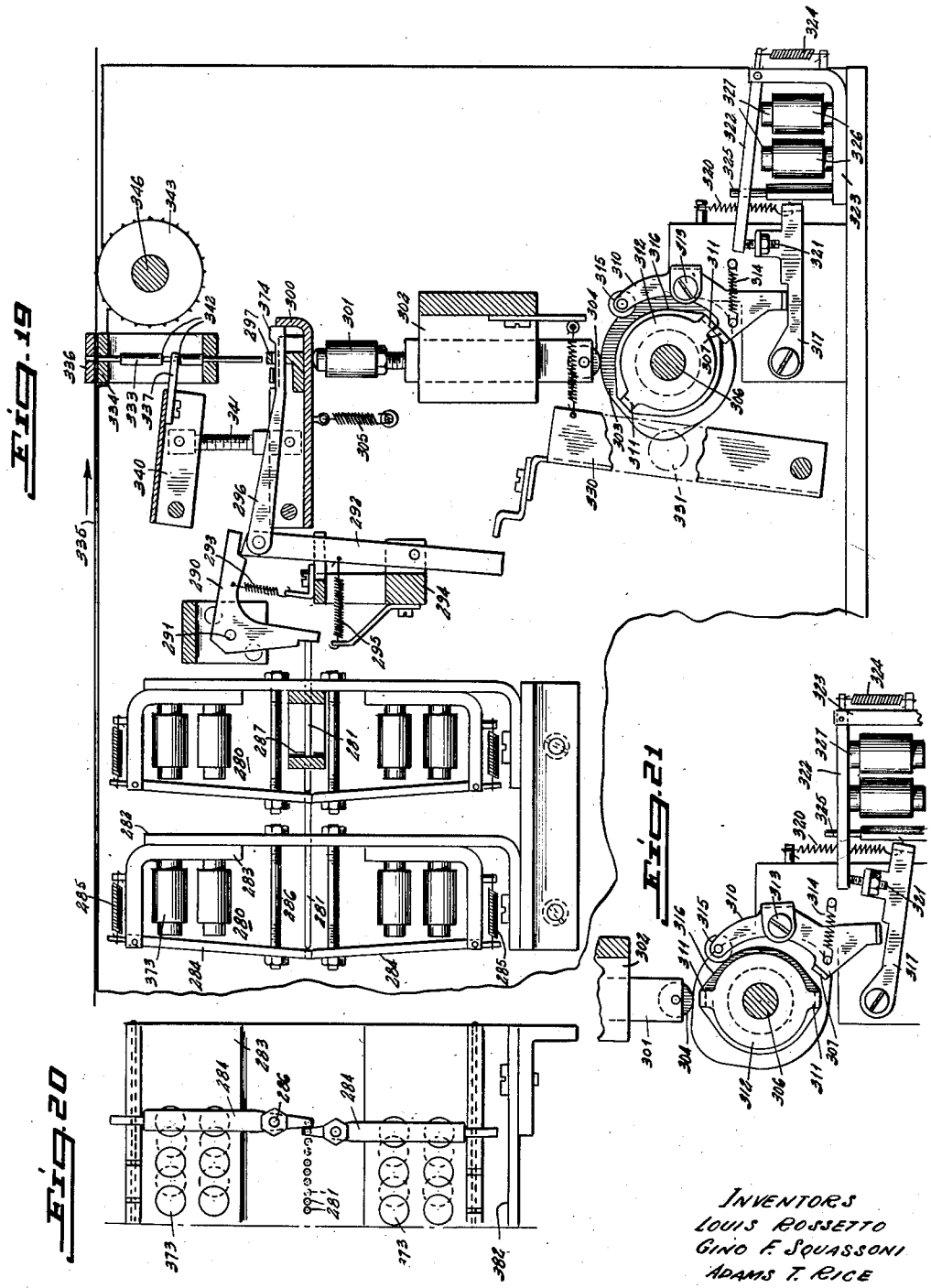

Dec. 17, 1957  L. ROSSETTO ET AL  2,816,609
TAPE PERFORATING MACHINE
Filed April 12, 1954  15 Sheets-Sheet 9
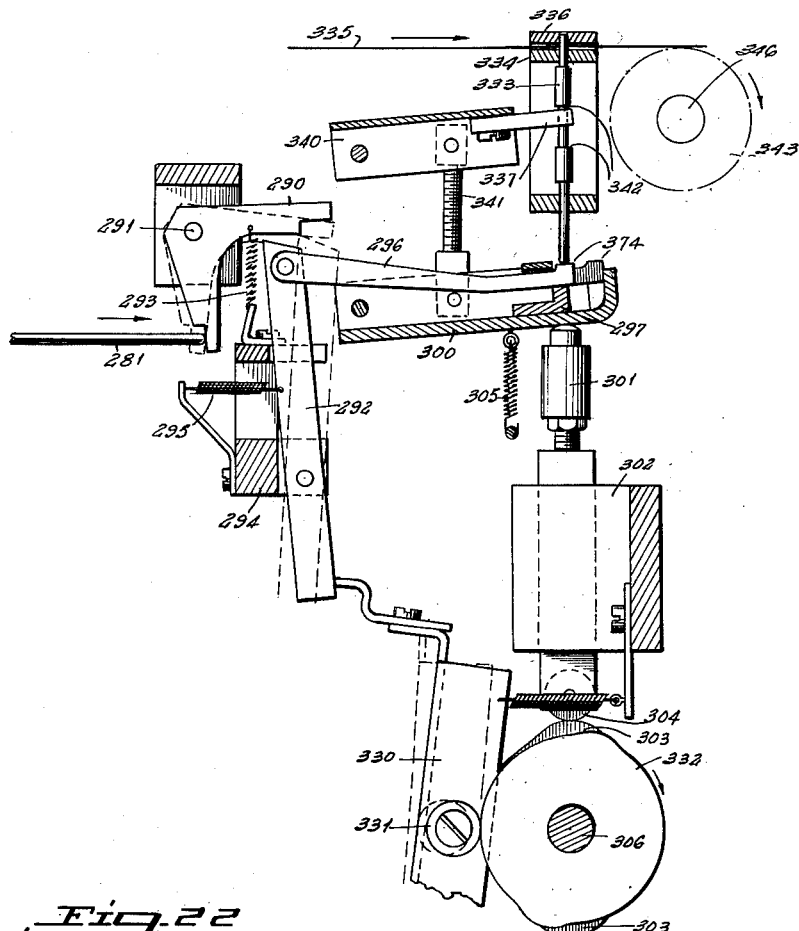
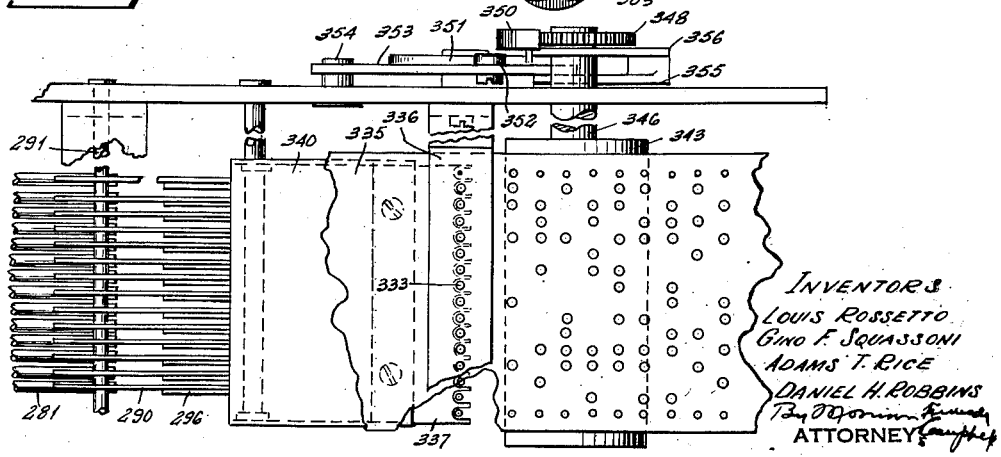
INVENTORS
LOUIS ROSSETTO
GINO F. SQUASSONI
ADAMS T. RICE
DANIEL H. ROBBINS
ATTORNEYS

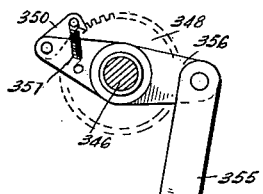
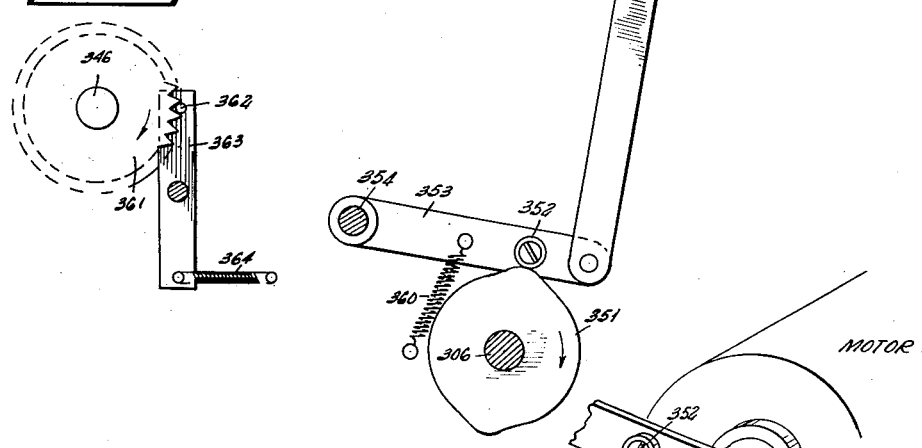
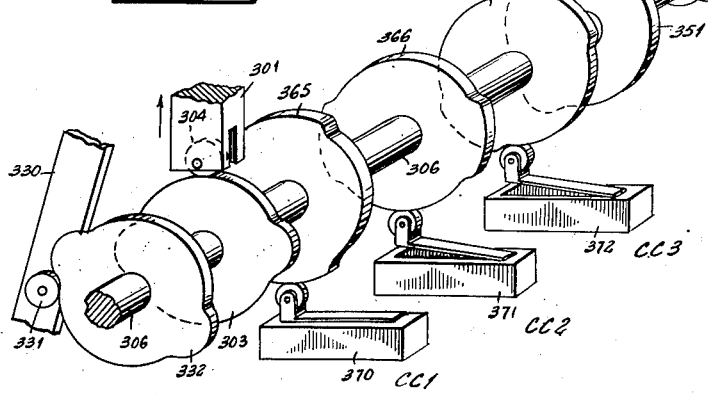

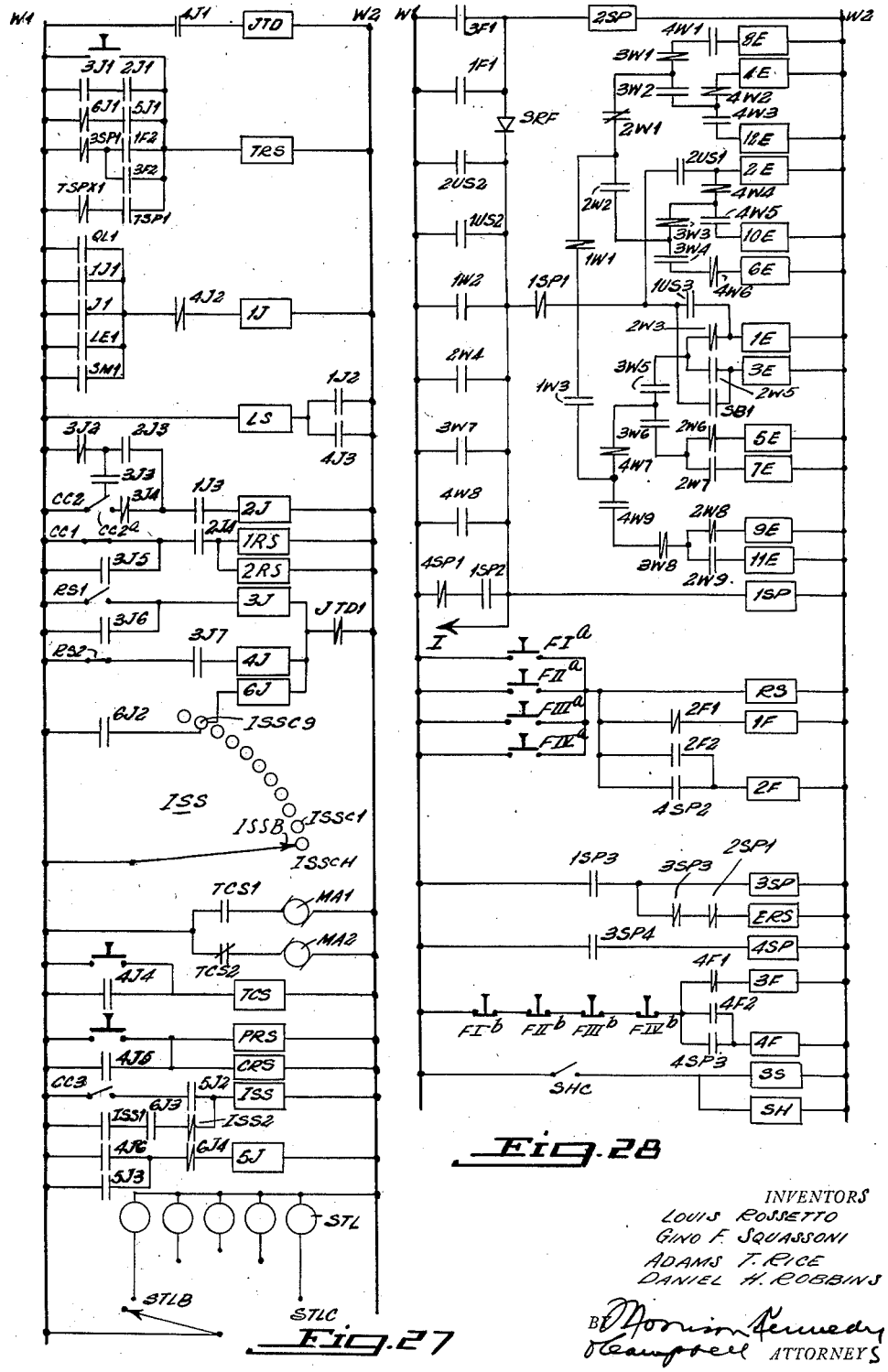

Dec. 17, 1957     L. ROSSETTO ET AL     2,816,609
TAPE PERFORATING MACHINE
Filed April 12, 1954     15 Sheets-Sheet 12

INVENTORS
LOUIS ROSSETTO
GINO F. SQUASSONI
ADAMS T. RICE
DANIEL H. ROBBINS
BY ATTORNEYS

Fig. 30A

Dec. 17, 1957   L. ROSSETTO ET AL   2,816,609
TAPE PERFORATING MACHINE
Filed April 12, 1954   15 Sheets-Sheet 14

Fig. 30B

INVENTORS
LOUIS ROSSETTO
GINO F. SQUASSONI
ADAMS T. RICE
DANIEL H. ROBBINS
BY Morrison, Kennedy
   Campbell  ATTORNEYS

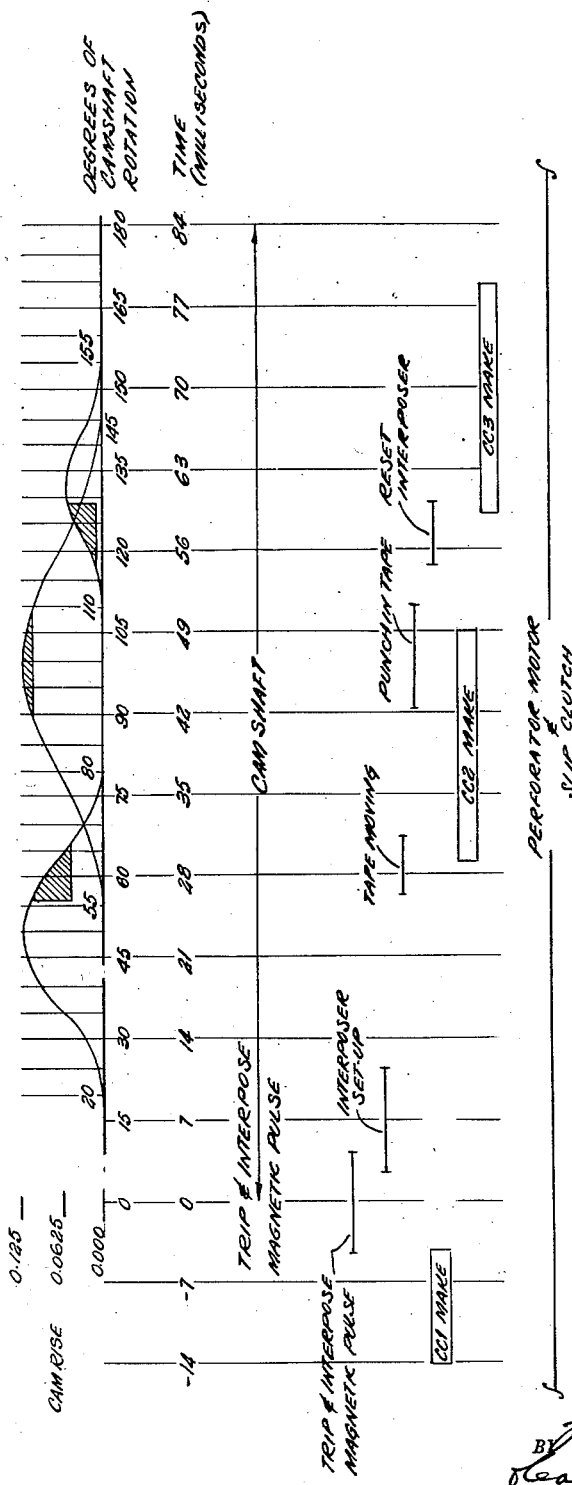
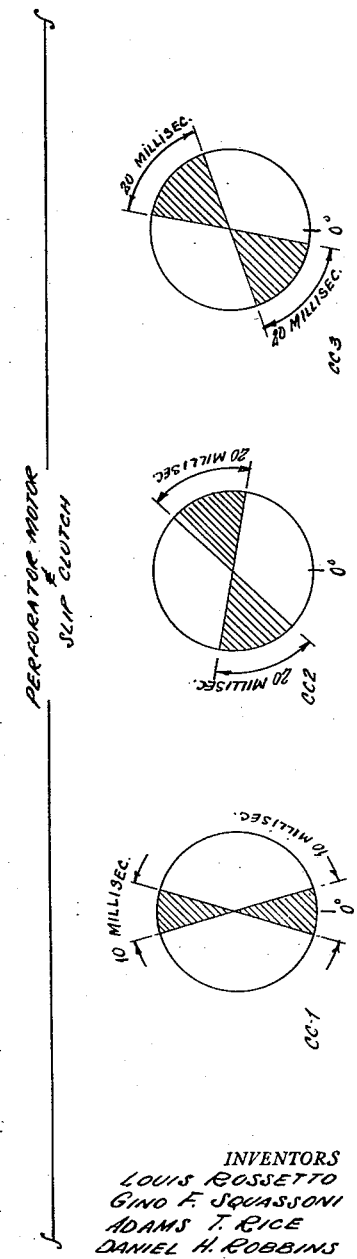
Fig. 31
INVENTORS
LOUIS ROSSETTO
GINO F. SQUASSONI
ADAMS T. RICE
DANIEL H. ROBBINS
ATTORNEYS

United States Patent Office 2,816,609
Patented Dec. 17, 1957

2,816,609

TAPE PERFORATING MACHINE

Louis Rossetto, Kings Point, Gino F. Squassoni, Lynbrook, Adams T. Rice, Staten Island, and Daniel H. Robbins, Bronxville, N. Y., assignors to Mergenthaler Linotype Company, a corporation of New York Application April 12, 1954, Serial No. 422,526

24 Claims. (Cl. 164—113)

This invention relates to a two-unit typographical photo-composing machine and is directed to the first or input unit, namely, a tape perforating unit. The second or output unit, which is a photographic unit operated under the control of the perforated tape produced by the first unit, forms the subject matter of a separate copending application Serial No. 419,012, filed March 26, 1954.

The first unit, which is the subject of the present application, comprises a keyboard (of the standard typewriter variety), a justification information computer, and a tape perforator. The actuation of the character keys produces character identification signals, as well as character width signals in the tape, and the actuation of the word space key likewise produces a word space signal in the tape. The character width and space width information is also transmitted to the justification computer which, in response to the actuation of an auxiliary justification key, produces a justification width signal and also an end-of-line signal in the tape. Other auxiliary keys are employed for the production in the tape of other signals which control the photographic unit.

The justification computer is operated by mechanical power and so is the tape perforator. Electrical means are employed for transmitting the code information as to set width from the character keys and the word space key to the justification computer as well as to the tape perforator, and additional electrical means are employed for transmitting the code information as to justification width from the computer to the tape perforator. The code bars, which are actuated by the character keys, are also operated by mechanical power. The character width code bars serve for both upper and lower case characters, being shiftable to different positions under control of the shift key of the typewriter keyboard.

The construction and operation of the parts will best be understood from the detailed description to follow.

In the accompanying drawings, the invention has been shown merely in preferred form and by way of example. Obviously, many changes and variations may be made therein without departing from the spirit of the invention. It should be understood, therefore, that the invention is not limited to any specific embodiment except insofar as such limitations are specified in the appended claims.

In the drawings:

Fig. 1 is a schematic side elevation of the composing and coding mechanism;

Fig. 2 is a detail view showing the coding unit switches and their means of actuation;

Fig. 3 is a schematic representation of the keyboard interlock;

Fig. 4 is a segmental view taken along line 4—4 of Fig. 2;

Fig. 5 is a segmental view, in perspective, showing a finger key and the coding mechanism actuated thereby;

Fig. 6 is a schematic representation of the auxiliary keyboard;

Fig. 7 is a plan view of the justification computer mechanism;

Fig. 8 is a front elevation of the squirrel cage escapement showing the motion arresting mechanism;

Fig. 9 is a detail view, in perspective, showing the rotor bar actuating mechanism;

Fig. 10 is a sectional view taken along line 10—10 of Fig. 8;

Fig. 11 is a partial rear elevation of the squirrel cage escapement showing the rotor bar actuating mechanism;

Fig. 12 is a front elevation of the dial mechanism for setting the length of a justified line;

Fig. 13 is a perspective view of the detent which locks justification computer parts in their set positions;

Fig. 14 is a detail view, in perspective, showing the starting pawl arrangement;

Fig. 15 is a front elevation of the switch carriage and its means of actuation;

Fig. 16 is a side elevation of the switch carriage showing how the switches are actuated toward the justification drum;

Fig. 19 is a sectional view showing the punch operating means of the tape perforator;

Fig. 20 is a schematic view showing the arrangement of the tape perforator electromagnets;

Fig. 21 is a detail view showing the cam shaft release mechanism in operated condition;

Fig. 22 is a plan view of a portion of the tape perforator;

Fig. 23 is a view showing the punch mechanism in operated condition;

Fig. 24 is a detail view showing the tape advance mechanism;

Fig. 25 is a view, in perspective, of the main cam shaft showing the cams located thereon;

Fig. 26 is a segmental view showing mechanism for preventing rearward movement of the tape;

Figure 29:
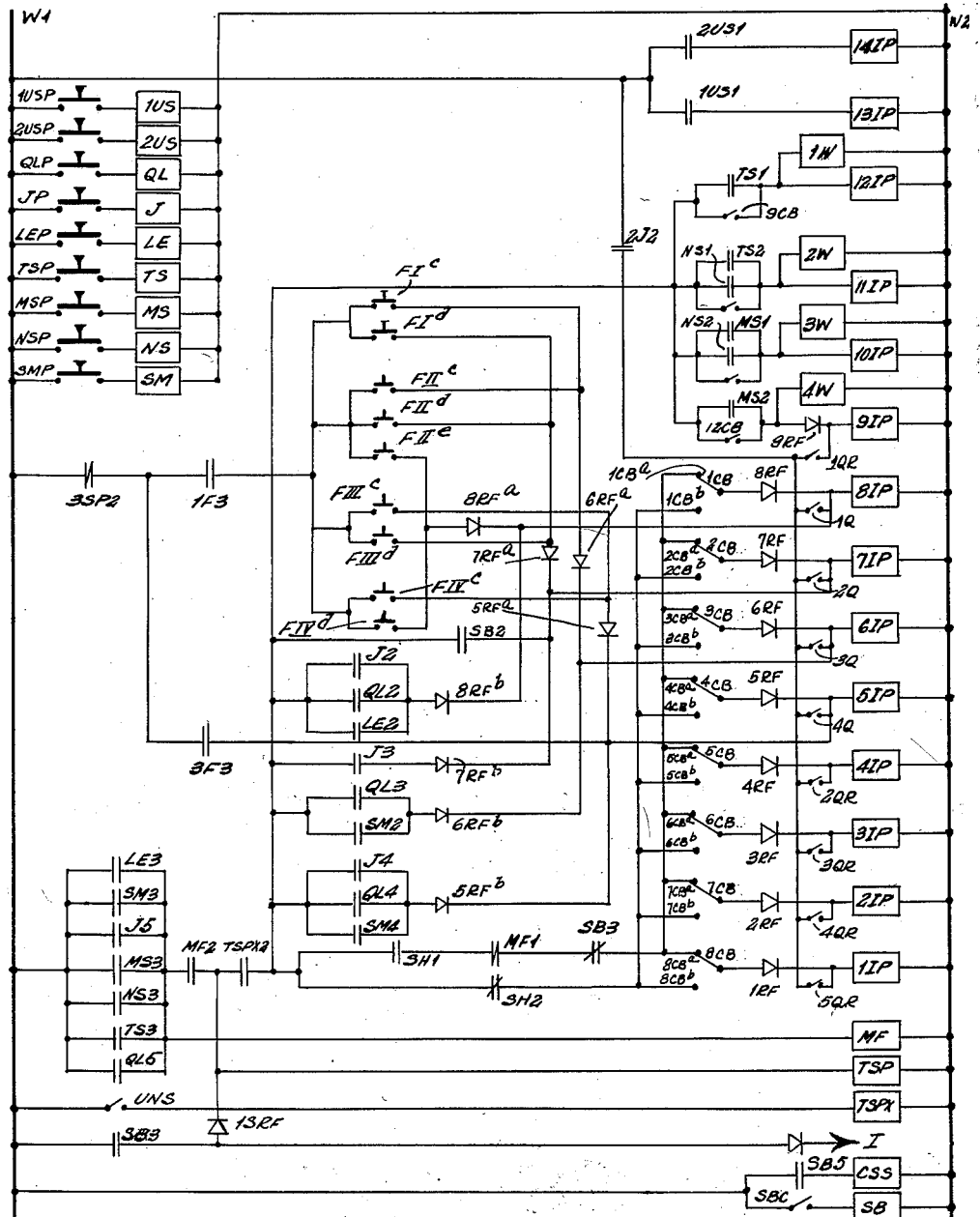

Figs. 27, 28 and 29 taken together constitute a schematic wiring diagram for the coded tape producing mechanism;

Figure 30A:
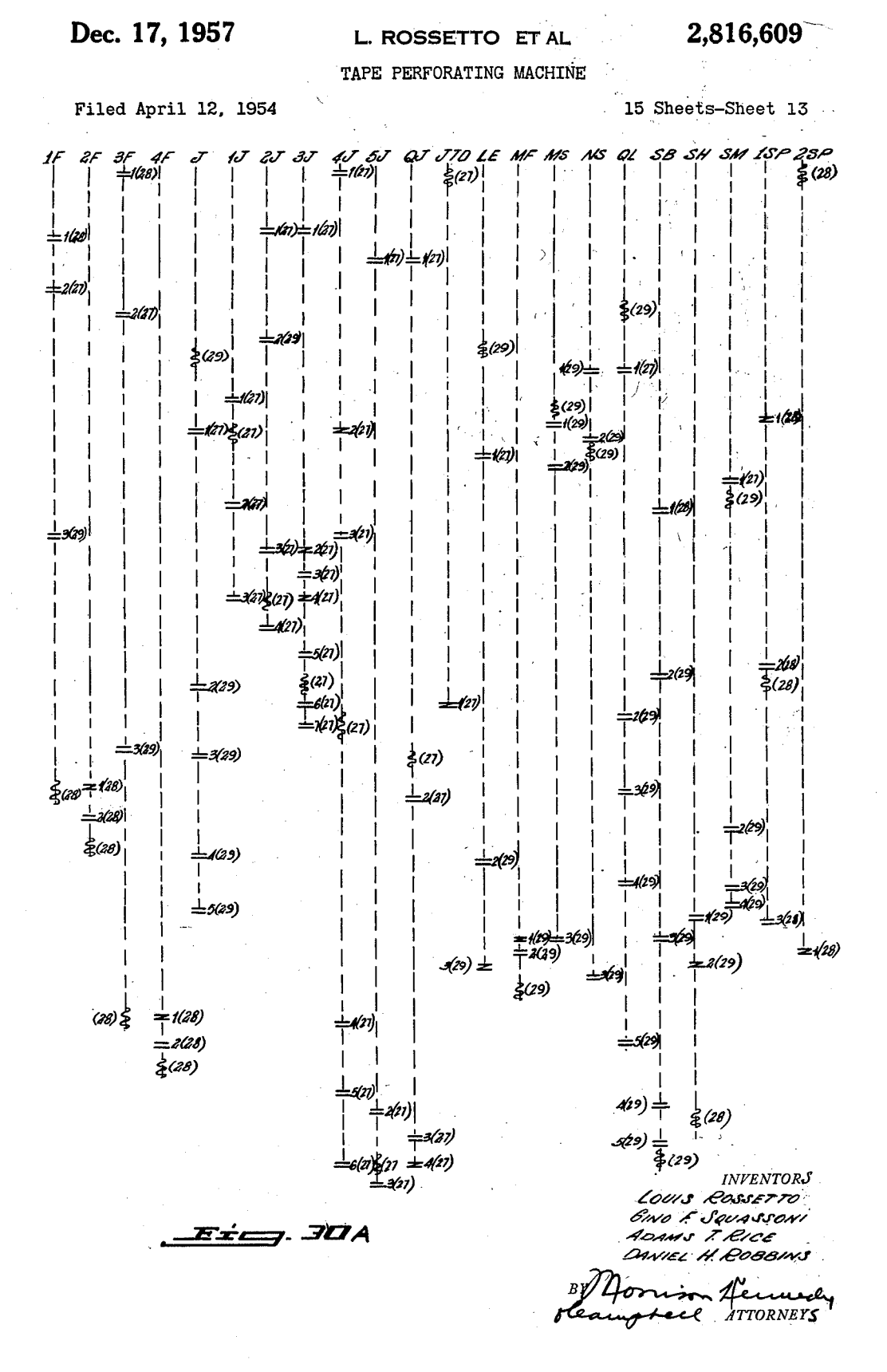

Figs. 30A and 30B are key sheets for Figs. 27, 28 and 29 showing the electromagnet switches in spindle form; and Fig. 31 is a timing diagram showing the relative operating times of the various cams and cam operated switches.

In general, the coded tape producing machine disclosed herein comprises a composing unit, a justification information computer and a tape perforator. Preferred embodiments of these components will be considered and described.

Composing and coding unit

Referring to Fig. 1, there is shown a composing unit which comprises a typewriter 50 and a power-actuated mechanism 51 operated therefrom for producing electrical code signals for transmission to the tape perforator. The typewriter is of conventional type but modified to some extent, as will hereafter be apparent. As the finger keys are successively depressed to code printed information, a typewritten proof copy of the coded information is simultaneously produced, thus providing visual means of determining whether or not correct information is being transmitted to the tape perforator. While the description will cover mechanical movements occurring when a single typewriter key is depressed, it is, of course, understood that there are a plurality of keys representing different characters and that the arrangement of finger keys, levers, type bars, and other components are similar to those in conventional typewriter machines. Thus, each key has associated therewith, two type bodies, one for printing in the "shift" position and the other for printing in the "unshift" position.

A finger key 53 is mounted on one end of key lever 54 which is pivoted on pin 55 and supported by frame member 56. The key lever is urged upwardly about its pivot by compression spring 57 and is in normal or unoperated position when it abuts a stationary machine member not shown. Operatively joined to lever 54 by connecting link 60 is an upwardly extending arm 61 which is pivotally supported by frame member 62. A wire hook link 63 connects the upper end of arm 61 to type bar 64, which latter is adapted to pivot on pin 65 and carry type body 52 in a path to strike platten 66.

An auxiliary key lever 67 is provided for pivotal movement about supporting pin 70. A lug 71 rising from the forward portion of the lever 67 engages the underside of key lever 54 and is maintained in abutting relation therewith by a tension spring 72 acting on the auxiliary lever. The front extremity of lever 67 is adapted to engage a key interlock 69, shown in plan view in Fig. 3. The interlock comprises a channeled member 73 having a plurality of balls 74 restrained therein but free to slide or roll longitudinally in the channel. The end walls 75 of the channel limit such movement, they being spaced apart a distance to permit only one auxiliary lever to be accommodated in the channel together with the balls. In this manner, depressing of more than one key at a time is prevented. Under certain circumstances, as when circuit sequences (to be later considered) are taking place, it is desirable that the actuation of a finger key be prevented until the sequence has been completed. To accomplish this, a locking solenoid 78 is provided which, when energized, slides the balls together and thereby prevents insertion of an auxiliary lever therebetween.

In position directly above the end of auxiliary lever 67 is a vertically arranged trigger actuating member 76, one end of which is shown rabbeted to receive lever 67. The forward edge of member 76 is provided with a cam surface 77 which, when member 76 is raised by auxiliary lever 67, bears against roller 80 to disengage member 76 from lever 67. Thereupon tension spring 81 returns member 76 to its unoperated or depressed position. It thus is apparent that no matter how long a key remains depressed, trigger actuating member 76 is only momentarily raised and then immediately returned to normal position. As will hereafter be seen, this means that even when a key is maintained in a depressed position only one signal for the character represented thereby will be transmitted to the tape perforator. A trigger 82 is pivotally supported on rod 83 and is provided with two arms, one of which rests loosely in a groove provided in member 76 for that purpose, and the other of which supports one end of a cam yoke 84. The other end of the cam yoke is urged downwardly on pivot rod 85 by compression spring 86. A cam 87, rotatably secured to the cam yoke, is provided with a stop pin 90 which engages a finger 91 of cam retaining bar 92 to hold the cam in normal position as shown. Below the cam is a continuously rotated rubber covered roll 93 which is motor driven through pulley 94 and belt 95. To conserve space, adjacent cam yoke assemblies are alternately disposed, forwardly and rearwardly of the trigger actuating members and consequently a second cam roll 96 is provided. A pair of spur gears 97 connect the two rolls for rotation in unison.

Above trigger actuating member 67 but spaced therefrom and in position to be engaged by cam yoke 84 is the code bar actuating member 100 which is slidable vertically in comb-plates 101 and 102. The actuating member is provided with a plurality of notches 103 in its opposite edges.

It is reiterated for the sake of clarity that, except for the cam operating rolls and their motor drive mechanism, all of the structural elements so far described are associated with a single key 53 and that similar elements are provided for each character key on the keyboard.

Arranged at opposite sides of the power-actuated mechanism are end brackets 104 which support a plurality of rocker rods 105. As is apparent from Fig. 5, the rods 105 are located in a single vertical plane but extend beyond the end brackets alternately. That is, one rod extends beyond one end bracket and the next rod extends beyond the opposite bracket. The extended portion of each rod is square shaped and has a cam member 106 mounted thereon. The cam member engages a roller 107 of a mechanical switch 110 fastened by means of bracket 111 to the adjacent end bracket. By this arrangement, as a rod is rotated, the cam member engages the switch roller and operates the switch associated therewith. As is shown there are a total of thirteen rocker rods and code bars, seven located forwardly of code bar actuating members 100 and six rearwardly. Four of the code bars and associated electrical switches transmit character width information, and eight of the code bars and associated switches are used to transmit character identification signals. The remaining code bar and switch is a so-called universal unit operated every time any key is depressed. The function of this latter unit will be discussed when the electrical circuits are considered.

To each of the rods 105 is clamped an intermediate bar 112 to which in turn is fastened a code bar 113. The leading edges of the code bars fit into the notches 103 formed in the code bar actuating members 100. Each of the bars 113 has a plurality of notches along its leading edge but the arrangement of notches varies from bar to bar. When the code bar notches coincide with the notches in any given actuating member 100, that member may be moved in a vertical direction without affecting the code bars so notched. By selective notching of the code bars, each code bar actuating member 100 may operatively engage a different combination of code bars from that engaged by every other code bar actuating member. When an actuating member operatively engages a code bar, the bar and the rocker rod to which it is fastened rock and thus cause a cam member 106 to operate the corresponding switch 110. It is thus apparent that for each actuating member 100 operated there is a distinct, unique combination of switches operated. As an actuating member 100 is restored to normal position, tension springs 114 return the operated code bar assemblies to their normal positions.

Fig. 5 shows compression springs 115 encircling a certain four of the rocker rods 105 and acting to yieldably maintain the intermediate bars and code bars fastened thereto in a prescribed position. However, under certain circumstances, the rocker rods are displaced against the action of the springs in order to locate the code bars in a second prescribed position. All other rocker rods and code bars are non-displaceable and are located in a single prescribed position. When the shiftable code bars are transported to the second position, the former alignment of the notches in the code bars with those in the code bar actuating members may be voided and a new combination of code bars operated when the actuating members are moved. This is desirable when it is remembered that each typewriter key, and consequently each code bar actuating member, represents two type characters, one for the shift position and one for the unshift position. The shiftable code bars are those which transmit character width information to the tape perforator, it being clear that the width of upper and lower case characters may vary, one from the other. Purely electrical means, which will hereafter be disclosed, are provided for transmitting character identification signals to the perforator for those characters represented in the shift position.

The mechanism for shifting the code bars will now be disclosed (see Fig. 5). Each shiftable rocker rod 105 has a projecting pin 116 secured to itself and on the end of the pin is a roller 117. The roller is engaged by one surface of a shiftable member 120 which is pivotally supported by link 121 and solenoid arm 122, the link and arm being arranged in parallel. Solenoid arm 122 is connected to shaft 123 of rotary solenoid 124. Hence, when the solenoid is energized, arm 122 is rotated clockwise and the code bars are consequently moved toward the left, compressing the springs 115. Movement of the rocker rods and code bars does not result in movement of the cam members 106 inasmuch as the members are slidable on the rocker rods and remain fixed in place. When the solenoid is deenergized, the compression springs return the code bars to their normal or unshift position.

Referring again to Fig. 1, it will be noted that when the shift key 125 is operated, in addition to normal typewriter performance in the shift position, a pair of electric contacts 126 are engaged. Similarly when the space bar 127 is depressed, electric contacts 130 are engaged. The function of these contacts will be apparent when the electric circuits are hereafter considered. An additional set of keys, the sole function of which is to engage electrical contacts when depressed, as will also later be described, are mounted on an auxiliary keyboard as shown schematically in Fig. 6.

It will not be assumed that a single key 53 is depressed and that the motor drive mechanism is operating so that rubber rolls 93 and 96 are rotating in the directions shown by the arrows: Depression of key 53 causes key lever 54 to depress the forward end of auxiliary lever 67 and pivot the lever about pin 70. The depressed end of the lever enters between two balls of the interlock and thereby prevents additional keys being simultaneously depressed. The opposite or rear extremity of the auxiliary lever engages trigger actuating member 76 and raises it, thus pivoting trigger 82 and permitting cam yoke 84 to fall. Thereafter, roller 80 swings member 76 out of engagement with lever 67 and spring 81 restores the trigger actuating member and the trigger to normal position. Falling of the cam yoke frees cam stop pin 90 from the retaining bar finger 91 to permit the cam to rotate when it strikes the rotating roll 93. The portion of the cam which first engages the rubber roll is provided with a plurality of serrations to insure immediate rotation of the cam. The cam is shaped so that, as it rotates, cam yoke 84 is lifted about rod 85 and the forward portion thereof strikes the lower end of code bar actuating member 100 and raises it. The actuating member thereupon rotates the universal code bar and its rod to operate the associated electrical switch. Similarly, a combination of the character width code bars will be pivoted to operate appropriate electrical switches as will a unique combination of character identification code bars to operate their electrical switches. The cam 87 continues to rotate to lower the cam yoke and reseat it on the trigger 82, which meanwhile has been returned to its normal position. The stop pin 90 on the cam 87 again engages finger 91 of retaining bar 92. At this time, code bar actuating member 100 is free to return to its normal position under the influence of springs 114 which also returns the operated code bars to their normal positions.

If instead of key 53 being depressed in the unshift position, shift key 125 is also depressed, the same train of mechanical movements would have occurred except that the character width bars would have been shifted as above described and a corresponding combination of code bars and their associated switches operated.

*Justification computer mechanism*

It has been seen from the foregoing discussion that each of the characters to be represented on the coded tape has a characteristic set width which is designated as a number of unit spaces. Considering a twelve unit "em," each character will have a characteristic width of so many unit spaces based on typographical considerations with the character "M" having a width of twelve units. It follows then that a composed line of code information will comprise a total number of unit spaces based on the sum of the width of the characters in the line and the width of the normal interword spaces. In a justified line of type composition, the number of unit spaces from and including the first character to and including the last character will be a constant value, or in other words, for a photo-type composing machine, a line of photographic type comprises a fixed number of unit spaces between the left hand and right hand margins. If the interword spaces are of normal value (e. g. three unit spaces), generally in typing and coding there will be a marginal space before the right hand margin which will vary from line to line and which should be apportioned among the interword spaces to produce a justified line. The present mechanism is intended to compute such apportionment. In carrying out the computations, the mechanism totalizes the characteristic set width of the characters appearing in the line and the widths of normal word spaces, subtracts this total from the number of unit spaces available in the full line and apportions the remainder among all the interword spaces. This information is translated electrically and transmitted to the tape perforator to appear as a code signal.

Reference will now be made to Figs. 8, 9, 10 and 11 of the drawings which show a "squirrel cage" escapement 140 utilized to translate character width information into degrees of shaft rotation. A rotor 141, pinned to shaft 142, is provided with a plurality of peripheral slots arranged longitudinally with respect to the shaft and in which rotor bars 143 are slidably positioned. Each bar 143 is provided with a projecting lug 144 which engages the side of the rotor and restricts movement of the bar in one direction along the shaft. A stop 145, also pinned to shaft 141, is provided to engage projecting lug 144 and restrict movement of the rotor bar in the other direction along the shaft. Thus it is clear that the rotor bars may be in either of two limiting positions. The rotor and its bars are positioned in bushing 146 secured to the stator plate 147.

The stator plate carries a plurality of mechanisms for actuating the rotor bars to their limiting positions, which mechanisms will be considered with particular reference to Fig. 9. Secured to stator plate is channel shaped bracket 150 having bifurcated arms 151, one of which pivotally supports rotor bar actuating lever 152 and the other of which serves as a guide permitting movement of the lever therebetween. One end of the lever is provided with an adjustable abutment comprising a screw 153 threaded in a block 154. With the mechanism secured to the stator plate 147, a solenoid 155 is so positioned that when energized, its shaft 156 engages screw 153 and pivots lever 152 about pin 157, thus causing the lower extremity of the lever to engage rotor bar 143 and move it to a protruding limiting position. Deenergization of the solenoid causes withdrawal of its shaft 156 and permits spring 160 to restore the lever 152 to its normal or unoperated position. The rotor bar 143, however, remains in its actuated position. As will be seen hereafter, the shaft 142 carrying the rotor is rotated until the protruding rotor bar 143 strikes stopping block 161, at which time shaft rotation is arrested. Stopping block 161 is loosely mounted on shaft 142, which can therefore freely turn therein. The block is held in fixed position by shock absorbing members such as tension springs 162 and 163, which maintain stopping block arm 164 in abutting relationship to adjustment screw 165, the latter simply being threaded in a projection 166 of web 167. Thus, as the shaft is rotated, a protruding rotor bar 143 strikes the block 161, causing it to skew slightly due to the tension springs which take the shock of the impact. The springs, however, restore the block to its normal position as determined by adjusting screw 165.

Mounted in position to restore the protruding rotor bar to its normal or non-actuated position is rotor bar restoring mechanism 170. As is apparent, this mechanism is identical to the actuating mechanism except that it moves the rotor bars in a direction opposite to that caused by the actuating mechanism. Restoration of the protruding bar, of course, permits further rotation of the shaft until such movement is again restricted as by another rotor bar, which had in the meantime been actuated, striking the stopping block. In operation, one bar is not restored to normal position until after the next bar is projected.

It should be evident that the squirrel cage escapement provides a ready means for totalizing the unit spaces represented by the typed matter. For example, assume that the shaft is in the start-of-line position and that the first character typed in the keyboard unit has a characteristic width of seven units. The seventh rotor bar will thereupon be projected as described. The shaft will be rotated until the projected bar strikes the stopping block, at which time the shaft rotation is arrested. Assuming the next character typed to have a characteristic width of four units, the appropriate solenoid to actuate and project the rotor bar four removed from the previously and still projected rotor bar is energized. After the second bar is projected, the previously projected bar is restored to normal position and the shaft rotates until the second projected bar strikes the stopping block. This operation continues until width information for a full line is introduced. The character widths of all the characters are totalized in the totalization process and depression of the space bar of the keyboard unit for each interword space results in the addition of three units to those already totalled for each preceding word.

A constantly running motor 171 drives squirrel cage rotor shaft 142 through belt 172, pulleys 173 and 174, and overload clutch 175. As has been noted in the description of the "squirrel cage," shaft 142 will be rotated intermittently and to a degree indicative of the character width information received from the coding unit. When a projecting rotor bar 143 of the squirrel cage stops rotation of shaft 142 due to its engagement with the stopping block 161, clutch 175 slips to permit continued rotation of the motor. Each time additional character width information is received in the justification computer mechanism, shaft 142 is intermittently stepped in a rotary deflection. The motion of the shaft is carried through the various mechanisms now to be described.

After passing through bushing 176, the shaft 142 has a worm 177 fashioned thereon and then passes through a second bushing 180 to spur gears 181. Worm 177 drives gear 182 to rotate shaft 183 and thereby to operate pointer 184. Setting of the pointer mechanism will hereafter be described.

The spur gear unit 181 transmits the initial shaft movement through releasable clutch 185 to a second spur gear unit 186. Gear 187 is provided with an abutment member 190 rigidly secured thereto. The position of member 190 is thus an indication of the total character width information received from the coding unit. Abutting member 190 is projection member 191 on disk 192, which latter is secured to the same shaft 193 as the justification drum 194 and consequently is rotated in accordance with drum rotation. A torque motor 195 drives the justification drum 194 through belt 196 and pulley 197 to maintain the members 190 and 191 in abutting relation. In this manner, the justification drum follows abutment member 190 and the drum's position is determined by the position of member 190 on gear 187, which position has been shown to be controlled by the totalized width information received from the coding unit. It follows, therefore, that drum 194 is positioned in accordance with the totalized width information. The drum itself will be hereafter considered.

After the information for one line has been coded and it is desired to begin computing the information for the next line, or in other words, at the beginning of a line, solenoid 200 is energized and lever 201 is pivoted about pin 202. The extremity of lever 201 is bifurcated and straddles clutch member 203 which is slidable on shaft 204, so that when the lever is pivoted, member 203 moves leftwardly as shown in Fig. 7 to disengage clutch 185. At the same time, the other end of lever 201 bears against shaft 205 to cause friction clutch 206 to engage and permit motor 207 to rotate shaft 205 and pulley 210 through gear unit 211 and the friction clutch. A belt 209 rotates gear 187 in a direction opposite to that in which the gear operates to totalize the unit spaces, until projection 212 engages pawl 213 on disk 214, at which time further motion of gear 187 is arrested. At this time, the mechanism is in its starting position. The pawl setting remains constant for a constant length of line.

The setting for the pawl 213 is effected as by crank 215 turning shaft 216 through pinion gearing 217. Rotation of shaft 216 sets the pawl position through gear unit 220 to which disk 214 is attached. It is to be observed that gear 221 and disk 214 can turn freely on shaft 222 and, conversely, that when the gear and disk are fixed in position, shaft 222 can rotate freely therein to return the mechanism to its starting position as above described. At the same time, shaft 216 acts through worm gear unit 223 to set pointer stop 224 in a fixed position. A scale 225 on shaft 216 is calculated to read twelfths of an "em" and dial 226 is marked to indicate "ems" (see Fig. 12). A marker or pointer 230 for the dial 226 and an associated marker or pointer 229 for the dial 225 are provided to facilitate reading of the justified line setting. Thus, if a fifty "em" line is to be justified, crank 215 is turned until the dial marking 50 appears opposite marker 230. The pawl 213 and the stop 224, which latter is secured to dial 226, are thereby set for justifying a fifty "em" line. Dog 231 is inserted in detent plate 232 to prevent further rotation of shaft 222 and thus lock in position the pawl 213 and the stop 224 (Fig. 13).

When the mechanism is actuated to start to compute justification, solenoid 233 is energized to disengage friction clutch 234 and permit torsion spring 235 to rotate pointer 184 until its motion is arrested by its contacting stop 224. Deenergization of solenoid 233 engages clutch 234 to reconnect pointer to shaft 183 and permit it to be stepped in accordance with the intermittent movement of shaft 142. As the unit spaces are being totalized, pointer 184 approaches scale 236 which is calibrated to indicate the unit spaces or twelfths of an "em" remaining in a line. When the pointer is on scale and to the right of an illuminated lamp 237, it is an indication to the machine operator that justification information can then be coded if desired. Successive lamps are illuminated, from right to left (see Fig. 12), as successive interword space information is received from the keyboard unit.

Figure 17:
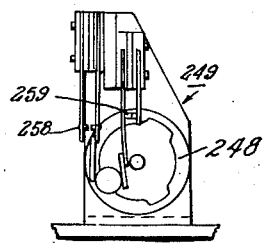
Fig. 17 is a view showing the contacts operated when the switches are actuated toward the justification drum.

The justification information is translated to electrical form by bringing a plurality of mechanical switches into position adjacent the justification drum. If the switch operating plunger encounters a raised portion of the drum, the switch will be actuated and an electrical signal transmitted to the tape perforator. The plurality of switches are mounted on a carriage for movement relative to the justification drum which is rotatably supported in bearing stands 240 and 241. Positioned to travel beneath the drum is the carriage 242 supported by wheels 243 (Figs. 15 and 16). A switch bracket 244 is pivotally mounted on the carriage by means of pin 245. A spring 246 maintains the bracket in one limiting position determined by fixedly mounted solenoid 247, the bracket abutting the solenoid shaft 250. A number of mechanically actuated switches 251 are mounted on the pivotal bracket and it will be noted that the operating plungers for the switches are maintained fairly close to the drum surface. When solenoid 247 is energized, bracket 244 is pivoted in a clockwise direction and the switch operating plungers are brought into still closer proximity to the drum surface. If, when so actuated, the switch plunger encounters a raised portion of the drum, the switch will be actuated, contrariwise; of course, if the drum surface is not raised, the switch will not be actuated. A similar plurality of switches and operating mechanism is mounted on the remote side of the justification drum to be operated simultaneously with the mechanism just described. Energization of solenoid 247 and its corresponding solenoid 248 actuates mechanical switch 249 to engage contacts 258 and separate contacts 259 (see Fig. 17).

As is shown in Fig. 15, mechanism is provided to step the switch carriage, and consequently the switches, longitudinally with respect to the drum axis. A detent block 252 is mounted on the underside of carriage 242. Held in engagement with block 252 by spring 253 is latch member 254 which is pivotally supported by pin 255. An additional ratchet member 256 is also in engagement with the detent block 252. The ratchet member is pivotally supported by one arm of bell crank 257 which in turn is supported by pin 260. A tension spring 261 urges ratchet 256 into engagement with block 252 and spring 262 urges bell crank 257 counterclockwise around its support. A solenoid 263 is positioned such that its shaft, when actuated, engages the horizontal arm of bell crank 257 and pivots the crank. Movement of the crank moves ratchet member 256 toward the right, as seen in Fig. 15, and thus positively moves the detent block 252 and the carriage 242 one position. Latch 254 is cammed out of locking position by the forward movement of block 252, but it immediately is restored to locking position by spring 253 when the forward movement is completed. The carriage and the switches mounted thereon are moved relative to the drum each time solenoid 263 is energized, the latter occurring each time an interword space signal is received from the keyboard unit. At the end of a line, when it is desired to restore the carriage to its start-of-line position, solenoid 264 is energized to remove the latch 254 and, through projection 258 which overlies ratchet member 256, member 256 from engagement with the detent block to permit tension spring 265 to restore the carriage to its normal position as desrmined by stop 266. A rotary switch 267 is provided to be stepped one position each time the carriage is advanced one position. The function of the switch is to illuminate lamps 237 in accordance with the advance of the carriage, i. e., with the number of interword spaces encountered.

Before considering the justification drum, the significance of several terms to be used will be explained. When information is being reproduced on a typewriter, there is a normal or standard spacing between words and there is a space between the last word and the right hand margin, a so-called marginal space. To provide a justified line of the reproduced information, it is desirable to divide the marginal space equally among the interword spaces. In a photocomposing machine, a full or justified line comprises a fixed number of unit spaces and the width of each character to be reproduced comprises a number of unit spaces (it will differ among different characters). It is apparent that by adding the unit spaces of the characters and the normal interword unit spaces, the marginal space will comprise a number of unit spaces equal to the number of unit spaces in a full line minus the total unit spaces taken by the characters in the line and the normal word spaces, and further that the number of unit spaces in the marginal space may not be divisible by the number of interword spaces to produce a whole number quotient. Thus, for example, if the marginal space is forty-seven (47) units and there are six (6) interword spaces, the quotient will be a mixed number, i. e. 7⅚. Inasmuch as there is a unit space whereby measurements are made, it is not desirable to attempt to increase each normal interword space 7⅚ unit spaces. The division of the marginal space is then allocated as follows: Each of the first five word spaces is increased by seven plus one, or eight, unit spaces, and the remaining word space is increased seven unit spaces. In this example, the quotient is seven and the quotient remainder is five. It is a function of the justification drum to enable the transmitting, to the tape perforator, of signals representing a quotient and a quotient remainder.

Figure 18:
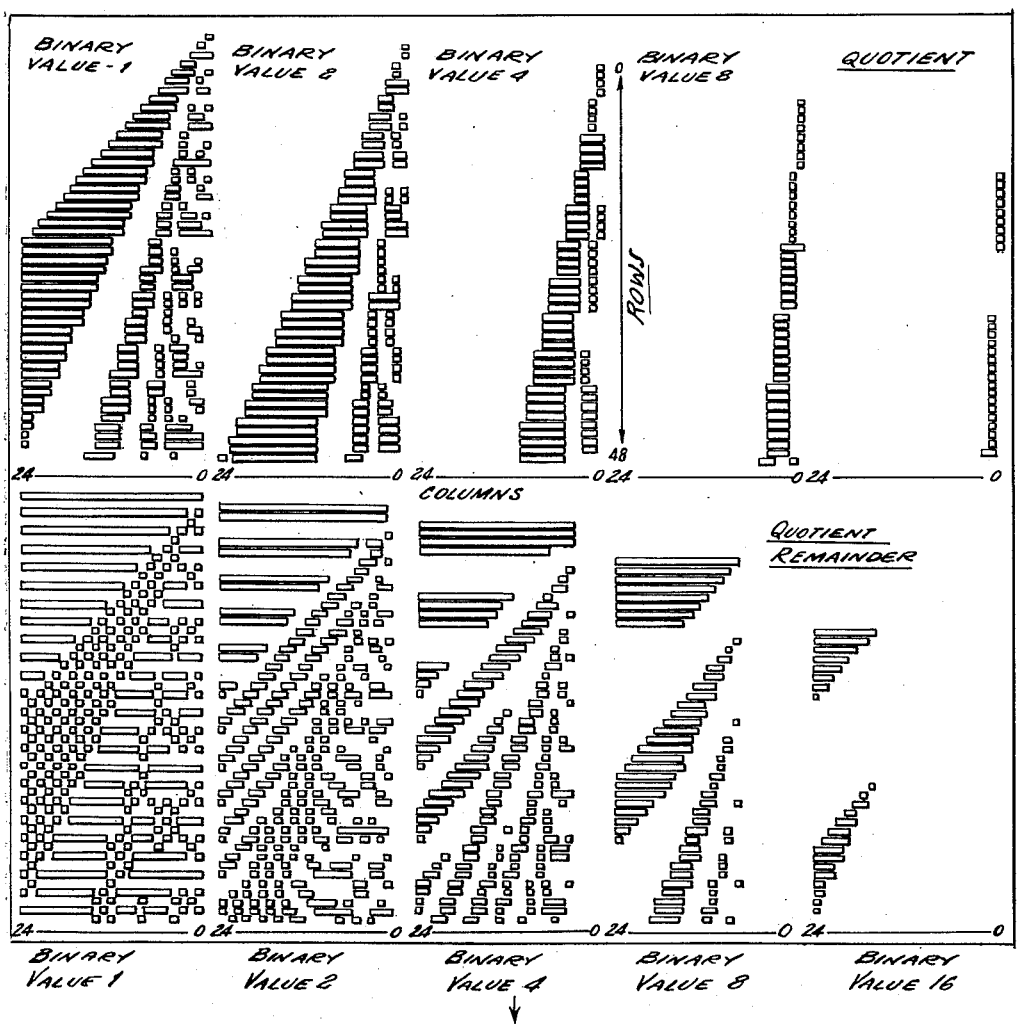
Fig. 18 is a developed view of the justification drum showing the pattern of raised surfaces thereon.

Reference is now made to Fig. 18 which shows the jusitification drum in developed form. Although the principles underlying the construction of the drum can be applied without limitation, the drum as shown in the preferred arrangement will compute the information required to produce a justified line when the marginal space is forty eight or less unit spaces and the number of interword spaces varies between one and twenty four, although the more improbable combinations within these limitations are not coded on the drum.

The drum may be thought of as being a smooth cylinder having a number of groups of code elements in the form of raised surfaces selectively located. Each group of raised surfaces may in turn be thought of in terms of rows and columns, there being on the disclosed drum forty eight rows and twenty four columns in each group. Associated with each group of raised surfaces is a code reading element in the form of a mechanical switch carried by the carriage 242.

The raised surfaces in the upper groups will, when they actuate the mechanical switches as before mentioned, produce signals representing a quotient as above defined. Reading from left to right, when a raised surface in the first group actuates a switch it will represent the value one (1), when a raised surface in the second group actuates a switch it will represent the value two (2), when a raised surface in the third group actuates a switch it will represent the value four (4), and when a raised surface in the fourth group actuates a switch it will represent the value eight (8). Although the fifth group would represent the value sixteen, no switch is provided for it. It is clear that if the different combinations of switches are actuated, the actuated switches can, in binary fashion, represent any value from one to fifteen. For example, if switches associated with the groups assigned the binary values of one, two and four are actuated, the value seven is represented thereby.

The raised surfaces in the lower group will similarly produce signals representing a quotient remainder. Here however, a mechanical switch is provided for each group of raised surfaces and it thus is possible to represent a quotient remainder value up to thirty one.

To summarize, each group, except the upper right hand one, will have a mechanical switch associated therewith. It will now be assumed that each switch will be located to the right of the right hand column of raised surfaces of its associated group and that this position is a starting or reference position. It will not be immediately important which row the switches are located opposite, this being determined by the setting of pawl 213 which will hereafter be more clearly set forth. Each time a signal representing an interword space is received from the coding unit, the switch carriage 242 is transported one position as before described to move the switches one column toward the left. If in coding a single line, there were seven interword spaces, the carriage would have been transported seven positions and each of the switch operating plungers 270 would be opposite its respective seventh column.

Now, rotary motion of the drum will be considered. In the developed view of Fig. 18, such motion will be assumed to be in the direction of the arrow. Each of the rows represents a unit space, so that if a character width information signal coming from the keyboard unit represents seven unit spaces, the drum will rotate in a manner as before described to advance seven rows to a reference line which is represented by the row of switch plungers 270. The drum in its actual form has a circumference of one hundred and four unit spaces which means that if signals for a total of one hundred and four unit spaces are fed to the squirrel cage, the drum will make one complete revolution. It is thus apparent that if a full or justified line comprises fifty "ems" or six hundred unit spaces, the drum will be set to make a number of revolutions. The pawl 213 will be set in order that if in fact six hundred unit spaces are totalized, the zero rows will be opposite the switch plungers 270. If five hundred fifty two unit spaces are totalized, the forty eighth rows will be opposite the switch plungers and for totalized spaces between five hundred and fifty two and six hundred, an associated row will correspond with the switch plungers. As signals in excess of five hundred and fifty two unit spaces are received, visual signal means (i. e. pointer 184 and lamps 237) will inform the machine operator that the end of the line is approaching and he may end the line and permit the machine to compute the justification. The drum is at this time presenting rows forty eight, forty seven, etc. to the reference lines of switch plungers 270 as additional unit space information is introduced to the mechanism and totalized. Pointer 184 and scale 236 indicate the row of the drum in decoding position which has been shown to be numerically equal to the remaining unit spaces before the right hand margin. It will now be assumed for purposes of illustration that further signals are introduced until the marginal space comprises twenty seven unit spaces. Consequently, the drum will stop its motion with the twenty seventh row opposite the switch plungers. It will be remembered that the carriage was moved to traverse the drum until all switches were in the seventh column. Arithmetically with a margin space of twenty seven units and seven interword spaces, the quotient is three and the quotient remainder is six. Referring to Fig. 18 it will be observed that there are raised surfaces on the drum in position to actuate switches to give a quotient value of three and a quotient remainder value of six. It is further evident that the pattern of raised surfaces is such that the quotient and quotient remainder can be computed for various combinations of margin space values and numbers of interword spaces. For example, if the marginal space comprises forty seven unit spaces and there are six interword spaces in the line, the quotient is seven and the quotient remainder is five. The forty seventh rows will be opposite the switch plungers and these in turn will be actuated to be opposite their respective column sixes. The drum will be provided with raised surfaces to actuate quotient reading switches having the assigned binary values one, two, and four or a total of seven and quotient remainder switches having the assigned binary values one and four or a total of five. From similar computations involving assumed marginal spaces and interword spaces, the whole pattern of raised surfaces on the drum was determined. It is thus possible, if desired, to extend the computation ability of the justification drum to include any value of marginal space or number of interword spaces. Generally, the physical size of the drum will determine the range of justification computations.

In operation, crank 215 will be turned until dial 226 and scale 225 show that the pawl 213 and the stop 224 are set for the desired length of line, e. g. fifty "ems." This setting of stop 224 controls the starting position of pointer 184 which, when it is stepped in accordance with width information from the keyboard unit, approaches scale 236 until with less than forty eight unit spaces left to complete the justified line pointer 184 coincides with the scale and directly indicates the remaining number of unit spaces in the marginal space. The setting of pawl 213 is such that if the justification drum is rotated as for a full line of fifty "ems," the zero rows would be opposite the switch plungers 270 and the unit would not transmit any signals to the tape perforator for quotient and quotient remainder, but if the information from the keyboard unit is halted while there is still a marginal space and pointer 184 coincides with scale 236, a correct signal for quotient and quotient remainder will be transmitted to the perforator. In other words, the setting of pawl 213 may be thought of as being determined by setting the justification drum so that the zero rows correspond with the rows of switch plungers and then rotating the drum backwards (i. e. in a direction opposite to that in which it rotates when unit space information is totalized) the number of unit spaces in the justified line. With a proper setting for stop 224 and pawl 213, dog 231 is inserted in detent plate 232 to lock the parts in such pre-selected position.

Before the introduction of signals representing width information to the unit, motor 207 is energized to bring projection 212 on gear 187 into abutting engagement with pawl 213. Also, motor 195 is energized to bring the justification drum to its starting position with disk projection 191 in abutting relationship with abutment member 190 on gear 187. The character width information and normal interword space information are transmitted to the justification computer mechanism and successively energize solenoids of the squirrel cage to intermittently step the squirrel cage rotor varying amounts depending on the particular signal introduced. Rotation of the squirrel cage rotor 141 actuates pointer 184 and causes it to step intermittently from its starting position against stop 224 toward scale 236. Rotation of rotor 141 also causes gear 187 to rotate in intermittent steps, the projecting member 212 moving from its starting position against pawl 213. As the width information is totalized, gear 187 may make more than one complete revolution, in which case projection 212 can freely pass over pawl 213 which is pivotally secured to disk 214 to permit passage of the projecting member in the one direction only. All the while the width information is being totalized and gear 187 and abutment 190 rotated, torque motor 195 is energized to maintain the projecting member 191 of the justification drum disk in engagement with abutment 190.

During the introduction of the width information to the justification computer mechanism, each time an interword space signal was received switch carriage 242 moved one position leftwardly as viewed in Fig. 7. Thus the carriage moved from a reference position, at the extreme right of the justification drum, in which the switch operating plungers 270 may be thought of as being in the zero columns, to a position in which the switch operating plunger is in a column corresponding to the number of interword spaces, e. g. if six interword space signals are received, the carriage is translated until all of the switch operating plungers are in alignment with their respective sixth columns. Furthermore, each time the carriage moves leftwardly one position, rotary switch 267 steps one position. Contacts of this switch control the successive lighting of lamps 237 on scale 236.

The above operations continue until pointer 184, moving toward the zero marking of scale 236, passes an illuminated lamp 237, the lamps being successively illuminated from the lower to the higher scale markings and the operator thus made aware that a justification signal can be computed and transmitted to the tape perforator. A mechanical push button type switch is then depressed to complete electrical circuits (to be hereafter considered) to energize solenoids 247 and pivot the mechanical switches inwardly toward the justification drum. If the operating plunger of a switch engages a raised surface of the drum, the switch is actuated and an electrical signal is thus transmitted to the tape perforator and recorded in coded form on the tape as a justification signal.

To prepare for the computation signal for the next line of composition solenoids 263 and 264 are energized to permit carriage 242 to return to its normal reference position. Also, solenoid 200 is energized to permit motor 207 to bring projecting member 212 on gear 187 back to its starting position in engagement with pawl 213. In addition, solenoid 233 is energized to free pointer 184 from shaft 183 and permit torsion spring 235 to restore the pointer to its starting position in abutting relationship with stop 224. The mechanism is thus ready for the introduction of width information for a succeeding line and the process is similarly continued for all lines of composition for which it is desired to compute justification.

It is, of course, to be understood that where numbers were used in the foregoing description, e. g. a fifty "em" line, they were used for illustrative purpose only. Also, the mechanism may be utilized in typographical systems in which the character widths are based on a eighteen or other unit em. In such case, the squirrel cage mechanism would be provided with a number of rotor bar actuating solenoids equal to the number of units in an em. In such case, it may also be desired to extend the computation range of the drum which can be accomplished in accordance with the foregoing teachings.

*Tape perforator*

In the foregoing description, there was considered a composing and coding unit which translated depression of the various character keys into electrical signals and a justification computer mechanism which converted justification information into electrical signals. Thus it was shown how representations of functions to be performed in a photocomposing operation were transposed from mechanical signals to electrical signals. It will now be shown how the electrical signals are utilized to provide a coded tape which will control photocomposing in the machine disclosed in the aforementioned copending application Serial No. 419,012.

A total of twelve electrical signals are sufficient to represent the various characters encountered in the photocomposition of ordinary information, eight signals being reserved to identify the characters and four signals being representative of character width. In addition, two signals are provided for unit spacing or letterspacing. Therefore, a total of fourteen individual signals are provided for, it being understood that, in general, less than this number of signals will be given at any one time. However, in the tape mechanism, which codes by selectively perforating a tape passed therethrough, provision is made for a total of fourteen punches to perforate the tape in accordance with the signals received from the keyboard unit and the justification computer. Furthermore, there is provided an additional pair of punch members, which will not be described, simply for producing feed perforations along the edges of the tape to advance it through the perforating mechanism and the output or photocomposing machine.

Referring to Fig. 19, there are observed four electromagnets 280. There are, of course, a total of fourteen electromagnets, one for each of the punches, arranged alternately as shown in order to form a compact unit. The magnets are located in pairs, one behind the other, and alternately disposed above and below, the linearly arranged interponent control rods 281 (see Fig. 20). Operation of a single punch will be described to set forth the structural elements of the mechanism although it is to be understood that, in general, more than one punch will be actuated at one time to provide a code signal in the tape.

Mounted on a fixed portion of the mechanism is a bracket 282 which supports electromagnetic switch frame 283. Pivotally supported in the frame is a switch armature 284 which is urged to a normal or nonoperated position as determined by tie bolt 286 by springs 285. The armature in normal position abuts one extremity of rod 281 which is guided endwise by member 287, also secured to bracket 282. Te opposite extremity of rod 281 abuts bell crank 290 pivoted on rod 291 and in turn abutting interponent lever 292. Tension spring 293 urges the bell crank into latching relationship with lever 292, which latter is pivotally supported by stationary member 294. An interponent 296 is pivotally connected to lever 292 and is slidably guided in member 297 secured in a pivoting tray 300. A plunger 301, positioned under tray 300, passes through member 302 and is thereby guided for reciprocatory motion in a vertical direction as a result of the action of cam 303 on plunger roller 304. A tension spring 305 maintans tray 300 in engagement with the plunger member and the latter's roller in engagement with the cam 303.

The cam 303 is shown keyed to main cam shaft 306 which is driven through a friction clutch by a continuously rotating motor (Figs. 19 and 20). Engagement of lug 307 on dog 310 with one or the other of two catches 311 formed on cam 312 arrests shaft motion and maintains the various elements in their neutral positions. Dog 310 is pivoted on pin 313 and is urged to rotate counterclockwise by spring 314. A roller 315, provided at one extremity of the dog, rides on cam surface 316 to restore the dog to its latching position, as will hereinafter be described. The other extremity of the dog is engaged by pivotal latch 317 which is held in engaging position by tension spring 320, thereby maintaining lug 307 in engagement with a catch 311 and preventing rotation of cam shaft 306. An adjustable abutment 321 of the latch 317 is engageable by electromagnetic switch armature 322, which latter is pivoted to switch frame 323 and maintained in a non-operated condition by spring 324. Retaining member 325 limits the effects of spring 324. A pair of electric coils 326 and cores 327 are provided to actuate the switch.

A member 330 is positioned to restore, through lever 292, the interponent 296 to its normal position (Figs. 19 and 23). Member 330 is provided with a roller 331 which is engaged by cam 332 to restore the interponent after a coded signal has been punched in the tape.

The tape punch 333 is located above the interponent 296 and its movement is regulated by member 334. The tape 335 passes between member 334 and die 336. The punch 333 is moved upwardly to perforate the tape in a manner which will be more fully explained when the operation of the mechanism is hereafter considered. A punch returning plate 337 is secured to pivoting member 340 and the latter is operatively connected to the tray 300 by an adjustable connection 341. The returning plate is fitted into recesses 342 of the tape punches and is therefore capable of returning the punches to their normal positions when tray 300 is restored to normal position by spring 305.

The tape 335 is advanced through the mechanism by the intermittent stepping of a pin roller 343 which engages perforations 345 punched along the edges of the tape (Fig. 22). The pin roller 343 is secured to shaft 346 as is ratchet wheel 348 and consequently the advance of the tape is controlled by the movement of the ratchet wheel. A click 350 engages the ratchet wheel to transmit motion thereto. This can best be understood by reference to Fig. 24. As the main cam shaft 306 rotates cam 351 in the direction of the arrow, the coincidence of the rise of the cam with roller 352 pivots lever 353 counterclockwise about stub shaft 354 to lift link 355 and thereby rock arm 356 about shaft 346. Click 350 is withdrawn from one ratchet groove and pulled into place in the next lower groove by spring 357, the head of the click being formed to facilitate its ready movement over the interposed ratchet tooth. As roller 352 rides off the high point of the cam, the operative parts are moved in a direction opposite to that just described and click 350 rotates the ratchet wheel. A spring 360 causes roller 352 to follow the cam contour and thus is the motive means for turning the ratchet wheel to advance the tape. In order to prevent oscillating motion of the ratchet wheel, the opposite end of shaft 346 is provided with a locking wheel 361 which is engaged by pin 362 of lever 363 under the influence of spring 364 (see Fig. 26). In this manner, backward motion of the ratchet is avoided and intermittent forward motion is not interfered with.

Cam shaft 306 also has secured thereto a number of switch operating cams 365, 366 and 367 which operate switches 370, 371 and 372 respectively (Fig. 25). The functioning of these switches will later be considered when the electrical circuits are described.

In operation, a plurality of electrical signals will be received by the tape perforator mechanism. For purposes of explanation only, a single signal will be considered and that to energize coil 373 of electromagnet 280. The resulting movement of armature 284 drives rod 281 to the right (as seen in Fig. 19) and thereby pivots bell crank 290 counterclockwise. Fig. 23 shows the structural elements now under consideration in operated condition. Operation of bell crank 290 frees lever 292 and permits spring 295 to pivot the lever counterclockwise, thus sliding the interponent 296 toward the left until the raised pad 374 at the end thereof rests immediately under the tape punch 333. Thereafter, coils 326 are energized to actuate switch armature 322 and depress latch 317. This is more clearly shown in Fig. 21. Movement of latch 317 downwardly permits spring 314 to rotate dog 310 and remove lug 307 from locking engagement with one or the other of the latches 311 of cam 312. Immediately cam shaft 306 is revolved (for a one-half rotation) to cause the cam 303 to lift the plunger 301 as the rise of the cam is brought under the roller 304. The plunger 301 thereupon engages the underside of tray 300 to pivot it and raise all the punches overlying the pads 374 of the actuated interponents 296. If an interponent is not actuated to bring its raised pad into position under the punch, the pivoting movement of the tray will have no effect upon the punch, due to the adjoining depression in the interponent. As roller 304 rides down the contour of the cam 303, spring 305 restores the tray to its normal position. In addition, punch returning plate 337 restores all operated punches to their normal position. Thereafter, cam 332 pivots member 330 to restore the lever 292 to its normal position, electromagnetic switch 280 being in the meantime deenergized, so that bell crank 290 is also returned to its normal position as shown in Fig. 19. All parts are restored to non-actuated position before latch 317 is pivoted back to the position shown in Fig. 19. Roller 315 of dog 310 follows the contour of cam 312 and thereby overcomes the force of spring 314 and pivots dog 310 so that the lug is in position to engage the second catch 311 and arrest cam shaft rotation. At this time, coils 326 are de-energized to permit spring 324 to restore latch 317 to normal position and hold dog 310 in its cam shaft locking position. Movement of the cam shaft 306 continues until catch 311 on cam 312 engages lug 307. Prior to the arrest of cam shaft motion, ratchet wheel 343 is actuated to advance the tape one step forward and thereby prepare for the recording of a subsequent code signal. The relative times of advancing the tape, perforating the tape and restoring actuated interponents are shown in Fig. 31.

It is to be emphasized that in the foregoing, an electromagnetic switch 280, a rod 281, a bell crank 290, an interponent 296 and its associated lever 292, are provided for each punch, whereas all the additional elements described, i. e. tray 300, plunger 301, etc., are singly provided for the mechanism as a whole.

*Electric circuits*

Having described the mechanical elements of the coded tape producing mechanism, there will next be described the electrical aspects thereof, particularly with regard to the interaction of the components of the mechanism.

Figures 27, 28 and 29 show the electrical circuits employed to control perforation of the tape in accordance with the information supplied from the coding unit and the justification computer mechanism. The circuits are shown in "straight" or "across-the-line" form in which the contacts of a switch are shown separated from the switch coil which operates them and arranged in the circuits which they control. Thus, it is possible to arrange each coil circuit in a "straight" line between parallel lines representing the power source. To facilitate locating contacts and relay coils referred to in the specification, there are provided a number of key or "spindle" sheets. On these sheets (Figures 30a and 30b), a vertical spindle is provided for each relay used in the electrical system. The spindles are identified by the relay designation for the relay associated therewith, the designations being arranged alphabetically across the top of the sheets. On each spindle, there is located representations of the relay coil and the relay contacts. The figure in which the coil or contact may be found is indicated parenthetically next to each coil or contact. In order to locate a contact on the straight or across-the-line diagram, it is merely necessary to place the spindle sheet containing the sought-after contact next to the indicated across-the-line diagram figure, whereupon the contact on the across-the-line diagram will be found in horizontal alignment with the contact on the spindle sheet. For example, to locate contacts 3J6, take the spindle sheet containing this contact, namely Figure 30a, locate the contact thereon and determine the figure in which contacts 3J6 appear. This is indicated by the numeral in parenthesis next to the contact designation. Place the spindle sheet Figure 30a next to the sheet containing Figure 27, and contact 3J6 will be found in horizontal alignment with the contact on the spindle sheet.

In the across-the-line diagram the following electromagnetic switches will be found:

1F First font relay
2F Second font relay
3F Third font relay
4F Fourth font relay
J Justification relay
1J First justification relay
2J Second justification relay
3J Third justification relay
4J Fourth justification relay
5J Fifth justification relay
6J Sixth justification relay
JTD Justification time delay relay
LE Line erase relay
MF Machine function relay
MS Em space relay
NS En space relay
QL Quad left relay
SB Space bar relay
SH Shift relay
SM Stop machine relay
1SP First squirrel cage pulse relay
2SP Second squirrel cage pulse relay
3SP Third squirrel cage pulse relay
4SP Fourth squirrel cage pulse relay
TRS Tripping switch
TS Thin space relay
TSP Tripping solenoid pulse relay
TSPX Auxiliary tripping solenoid pulse relay
1US First unit space relay
2US Second unit space relay
1W First width relay
2W Second width relay
3W Third width relay
4W Fourth width relay Throughout the description which follows, these letters will be applied to the coils of the above designated relays. Also, with reference numerals appended thereto, they will be applied to the contacts of these relays. The electromagnetic switches are shown in deenergized condition.

In addition to the above electromagnetic switches, the following mechanically actuated push-button type switches are also located in the across-the-line diagram and are used to code certain machine functions.

FI First font selection switch
FII Second font selection switch
FIII Third font selection switch
FIV Fourth font selection switch
EMP Em space signal switch
ENP En space signal switch
JP Justification signal switch
LEP Line erase signal switch
QLP Quad left signal switch
TSP Thin space signal switch
SMP Stop machine signal switch
1USP One unit space switch
2USP Two unit space switch The following perforator cam shaft operated timing switches are illustrated with the contacts in the condition prevailing when the main cam shaft is in arrested position:

CC1 First cam actuated switch
CC2 Second cam actuated switch
CC3 Third cam actuated switch The following keyboard code bar actuated switches are included in the wiring diagram:

1CI First character identification switch
2CI Second character identification switch
3CI Third character identification switch
4CI Fourth character identification switch
5CI Fifth character identification switch
6CI Sixth character identification switch
7CI Seventh character identification switch
8CI Eighth character identification switch
1WI First width information switch
2WI Second width information switch
3WI Third width information switch
4WI Fourth width information switch
UNS Universal switch and also the following justification computer operated switches:

1Q First quotient switch
2Q Second quotient switch
3Q Third quotient switch
4Q Fourth quotient switch
1QR First quotient remainder switch
2QR Second quotient remainder switch
3QR Third quotient remainder switch
4QR Fourth quotient remainder switch
5QR Fifth quotient remainder switch In addition the wiring diagram includes the following solenoids:

CRS Carriage reset solenoid
CSS Carriage stepper solenoid
1E, 2E–12E Squirrel cage indexing solenoids
ERS Squirrel cage resetting solenoid
JRS Justification reading solenoid
JRSX Auxiliary justification reading solenoid
LS Locking solenoid
PRS Pointer return solenoid
RS Typewriter ribbon shift solenoid
SS Shift solenoid
TCS Tooth clutch solenoid Also, the Interline stepping switch ISS is employed in the electrical system.

To prepare the photocomposing machine input unit, the electrical circuits are first connected to a source of power by switch means, not shown. A circuit is thereupon completed for third font relay coil 3F from line W1, through normally closed contacts of the font selection pushbuttons FI, FII, FIV and FV, contacts 4F1 and coil 3F to line W2 thus engaging contacts 3F1, 3F2 and 3F3. Engagement of contacts 3F3 completes a circuit for the interponent control magnet coil 5IP from line W1, through contacts 3SP2, 3F3 and coil 5IP to line W2. Contacts 3F2 complete a circuit for tripping switch coil TRS from line W1, through contacts 3SP1, 3F2 and coil TRS to line W2. Operation of magnet 5IP caused an interponent to be actuated in preparing the punch located thereabove to perforate the tape. Energization of coil TRS actuates dog 310 and permits the main cam shaft of the tape perforator to rotate one cycle or until the dog again engages a catch. When the shaft rotates plunger 301 is raised to cause the actuated interponent to engage its punch and perforate the tape. During the cycle, squirrel cage pulse relay 1SP was energized, the circuit being traced from line W1, through contacts 3F1, rectifier SRF, and coil 1SP to line W2. The relay is timed so that it is not operated immediately upon its coil being energized, but rather at some slight interval thereafter. Operation of the switch engages contacts 1SP2 and 1SP3 and separates contacts 1SP1. Contacts 3F1 also completed a circuit for squirrel cage pulse relay 2SP to separate contacts 2SP1. Engagement of contacts 1SP3 completed a circuit for squirrel cage relay 3SP from line W1 through contacts 1SP3 and coil 3SP to line W2, thus engaging contacts 3SP4 and separating contacts 3SP1, 3SP2 and 3SP3. A circuit for the squarrel cage resetting solenoid ERS is not completed at this time inasmuch as contacts 2SP1 separated before contacts 1SP3 engaged, the latter being on a relay time delayed in operating.

Separation of contacts 3SP1 interrupts the circuit for tripping switch coil TRS and permits the switch to be restored to normal position and dog 310 returned to latching position. Rotation of the main cam shaft of the perforator unit is thus limited to one cycle or one hundred eighty degrees (180°) of revolution. Engagement of contacts 3SP4 directly completed a circuit for coil 4SP, thereby actuating squirrel cage pulse relay 4SP and engaging contacts 4SP2 and 4SP3 and separating contacts 4SP1. Contacts 4SP3 complete a circuit for fourth font relay coil 4F and contacts 4F2 engage and contacts 4F1 separate, contacts 4F2 providing a self holding circuit for coil 4F. Separation of contacts 4F1 interrupts the circuit for coil 3F thereby restoring all of the previously traced circuits to their normal condition under which the relay coils therein are deenergized and the relays themselves are in non-operated positions. It will be noted, though, that the circuit for coil 4F remains energized until a new font is selected for photographing, at which time the circuit for coil 4F will be interrupted by separating the back contacts, e. g. FII*b* of one of pushbuttons FI, FII, FIII or FIV.

After the tape is perforated, it is advanced in the perforator mechanism as above described in readiness for the punching of a subsequent signal. The signal thus punched when decoded in the photocomposing machine output unit will result in a particular font being positioned in order that the characters thereon may be photographed. This particular font is designated a "home" font and, as has been seen, will be the one normally photographed. Hereafter, circuits will be described for coding the tape to select a different font.

After having connected the electrical circuits to a power source and thereby automatically produced a font signal in the tape for the "home" font, the operator depresses the justification push-button JP. Push-button JP directly completes a circuit for justification relay coil J to engage contacts J1, J2, J3, J4 and J5. Engagement of contacts J5 immediately complete a circuit for machine function relay coil MF to engage contacts MF2 and separate contacts MF1. A circuit can next be traced from W1 through contacts J5, MF2 and tripping solenoid pulse relay coil TSP and auxiliary tripping solenoid pulse relay coil TSPX, to line W2, the two coils being connected in parallel. In the arrangement provided, these relays are time delayed in operating so that their contacts do not immediately separate or engage, as the case may be. The time delay introduced will be assumed, for purposes of description, as being five milliseconds for relay TSP and twenty-five milliseconds for relay TSPX. At the expiration of the time delay for relay TSPX, contacts TSPX1 separate and contacts TSPX2 engage. Engagement of the latter contacts completes a circuit for interponent control magnet coils 5IP, 7IP, and 8IP, the circuits therefor being traced through contacts J5, MF2, TSPX2 and through contacts 14 and coil 5IP, contacts J3 and coil 7IP, and contacts J2 and coil 8IP, respectively. As will be recalled from the description of the perforator unit, energization of the magnets actuates the interponents to prepare for the perforation of the tape by the punches located above the actuated interponents.

Although the foregoing description spoke of time delays, it will be noted that the times involved are quite small and they are introduced simply to introduce a short pulse in circuits now to be described. Since relay TSP will be actuated and contacts TSP1 engaged for twenty milliseconds before relay TSPX is actuated and contacts TSPX1 separated, a circuit will be completed through these contacts for coil TRS, thus energizing the coil for twenty milliseconds or until contacts TSPX1 separate. Energization of coil TRS for that short interval permits rotation of the main cam shaft of the perforator unit for one cycle. As before, rotation of the cam shaft results in plunger 301 causing the actuated interponents to engage their associated punches and perforate the tape. Of course, by the time the plunger is raised, the interponents are actuated, even though the cam shaft started to revolve approximately twenty milliseconds prior to actuation of the interponents. The signal thus punched in the tape is designated as an end-of-line signal.

At the time the above circuit sequence is taking place, a second sequence is also occurring due to the engagement of contacts J1, which completes a circuit for the first justification relay coil 1J, through contacts J1, 4J2 and the coil. Completion of this circuit results in the engagement of contacts 1J1, 1J2 and 1J3. Contacts 1J1 complete a self holding circuit for coil 1J and contacts 1J2 energize the keyboard locking solenoid LS which prevents depressing of a keyboard key while the present circuit sequence is taking place.

Before continuing with the description of the justification sequence, it will be helpful to review Figure 31, which shows when the switches CC1, CC2 and CC3 are actuated inasmuch as these switches enter into the present circuits and control their time of operation. Figure 31 indicates that when the main cam shaft 306 is in arrested position, marked "0°," switch CC1 is operated and its contacts engaged while both switches CC2 and CC3 are non-operated and their contacts separated. After the shaft rotates a slight amount, switch contacts CC1 separate. As the shaft continues to rotate switch CC2 contacts engage, contacts CC3 engage, contacts CC2 separate, contacts CC1 again engage and contacts CC3 separate, after which the shaft rotation is arrested in the position marked "180°." The same sequence of switch operations occur during the next 180° of shaft rotation. Thus it is apparent that one revolution of the shaft results in two cycles or switch operation sequences. One complete revolution of the shaft takes approximately one hundred and thirty-five (135) milliseconds and the switch operations take place at the approximate times shown, although the exact times designated are not critical.

The previous circuit sequence description covered the energization of the tripping switch coil TRS which permitted rotation of the main cam shaft for one cycle and operation of switches CC1, CC2 and CC3 as discussed in the last paragraph. The initial engagement of contacts CC1 is ineffective inasmuch as contacts 2J4 are separated, nor is the normal engagement of the contacts CC2 effective since contacts 3J3 and 2J4 are also separated. As the cam shaft rotates, contacts CC2a engage to complete a circuit for the second justification relay coil 2J through contacts CC2a, 3J4, 1J3 and the coil. The resulting engagement of contacts 2J3, together with contacts 3J2, completes a self holding circuit for the coil. The engagement of contacts 2J1, 2J2 and 2J4 are ineffective at the present time. The subsequent engagement of cam operated contacts CC3 is likewise ineffective during this cycle of cam rotation. Further rotation of the cam to complete the cycle separates contacts CC2a and engages contacts CC2, separates contacts CC3 and again engages contacts CC1. During this single cycle of the cam, the tape advanced in the perforator unit due to the action of the ratchet mechanism previously described. To recapitulate the happenings of the single cycle of cam rotation, the tape was advanced one position in the tape perforator, and thereafter a signal designated as an "end-of-line" signal was punched in the tape. Relays 1J and 2J remain energized, the former to lock the keyboard and prevent depression of keys while this sequence is taking place and the latter to prepare for further relay functions, now to be described.

At the time contacts CC1 engaged, near the end of the cam shaft cycle, a circuit was completed for the quotient and quotient remainder switches (1Q to 4Q and 1QR to 5QR) actuating solenoids 1RS and 2RS, the circuit therefor being through contacts CC1, 2J4 and the parallel connected solenoids 1RS and 2RS. Energization of these solenoids pivots switch brackets 244 inwardly so that the mechanical switches come into proximate relation to the justification drum. It is now assumed that none of the switches come into engagement with raised portions of the drum and consequently none of the switches are operated. This sequence is important, however, because during normal operation of the unit, it is at this time that certain interponents are actuated to prepare for the punching of a justification signal. This will be considered later.

Energization of the solenoids 1RS and 2RS separates contacts RS2 (259) and engages contacts RS1 (258), the latter to complete a circuit for the third justification relay coil 3J from line W1 through contacts CC1, coil 3J and contacts JTD1 to line W2. Contacts 3J6 thereupon engage to complete a self holding circuit for coil 3J. Contacts 3J1, together with contacts 2J1 (it will be remembered that relay 2J remained energized from its energization during the first cam cycle) complete a circuit for tripping switch coil TRS to thus inaugurate a second cam cycle. Contacts 3J3 engage before contacts 3J2 separate and consequently a circuit for coil 2J is completed through contacts CC2 and 3J3 before the circuit through contacts 3J2 is interrupted to thus maintain coil 2J energized. Separation of contacts 3J4 is ineffective for the time being. Contacts 3J5 provide a holding circuit around contacts CC1 for the actuating solenoids 1RS and 2RS. Contacts 3J7 will be mentioned later.

As the cam shaft begins its second cycle, contacts CC1 separate but without any effect due to the parallel 3J5 contacts. The tape is advanced one position through the perforating mechanism. Contacts CC2 separate to interrupt the circuit for coil 2J, thus restoring relay 2J to its deenergized position and separating contacts 2J1, 2J2, 2J3 and 2J4. The immediate engaging of contacts CC2a is of no avail inasmuch as contacts 3J4 are separated. Separation of contacts 2J1 interrupts the circuit for tripping switch coil TRS. Separation of contacts 2J2 interrupts the circuit through the various quotient and quotient remainder switches. Contacts 2J3 separate in an already interrupted circuit and contacts 2J4 when separated deenergize solenoids 1RS and 2RS to permit the switch brackets 244 and the mechanical switches carried thereby to return to normal position remote from the justification drum. Deenergization of the solenoids separates contacts RS1 without effect due to the parallel 3J6 contacts, and engages contacts RS2 which, with contacts 3J7, complete a circuit for fourth justification switch coil 4J to engage contacts 4J1, 4J3, 4J4, 4J5 and 4J6 and to separate contacts 4J2.

Engagement of contacts 4J1 completes a circuit for justification time delay switch coil JTD. The switch is delayed in operating and therefore contacts JTD1 do not immediately separate. Before they do separate, however, the following circuit operations rapidly occur. Contacts 4J2 interrupt the circuit for coil 1J to separate contacts 1J2, separation of which together with contacts 4J3, already separated, interrupts the circuit for keyboard lock solenoid LS, thus permitting the keyboard to be operated in a normal manner. Contacts 4J4 complete a circuit for the tooth clutch solenoid TCS (reference number 200 in Figure 7) which, it will be recalled from the description of the justification computer mechanism, restored that mechanism to a starting position in preparation for the composing of a new line. Engagement of contacts TCS1 completes a circuit for motor MA1 (207) which restores the mechanism to its start of line position. Separation of contacts TCS2 interrupts the circuit for motor MA2 (195) which drives the justification drum. Contacts 4J5 complete circuits for the pointer return solenoid PRS and the carriage return solenoid CRS (reference numerals 233 and 264 in Figures 7 and 15 respectively) which likewise restore parts of the justification computer mechanism to a starting position. Contacts 4J6 complete a circuit for the fifth justification relay coil 5J through contacts 6J4. Energization of this latter switch engages contacts 5J1, 5J2 and 5J3, the latter of which are connected in parallel with contacts 4J6 and consequently provide a self holding circuit for coil 5J. Contacts 5J1 complete a circuit for tripping switch coil TRS which extends from line W1, through contacts 6J1, 5J1 and coil TS to line W2. This circuit, as will be seen, remains completed until contacts 6J1 separate to interrupt it. In operation, the coil TRS will be energized to permit the main cam shaft to rotate to complete a number of cycles.

Before the remainder of the circuit operations occur, plunger 301 is operated to raise the interponent tray and perforate the tape according to the actuated interponents to give a justification signal. Inasmuch as the present circuit operations stemmed from preparing the tape for use and not from what might be called a normal composing operation, there is no justification signal and consequently no perforating of the tape.

To continue with the circuit sequence, after plunger 301 is operated, contacts CC2a separate and contacts CC2 engage without any effects on the remaining circuits. However, when contacts CC3 engage, a circuit is completed for the interline stepping switch coil ISS from line W1, through contacts CC3, 5J2 and coil ISS to line W2. When contacts CC3 separate, due to continued cam shaft rotation and coil ISS thereby deenergized, stepping switch ISS is actuated to remove brush ISSB from the home contact ISSCH to the next adjoining contact, i. e., ISSC1. When the brush is off home contact ISSCH, contacts ISS1 engage and they only separate when the brush again reaches home contact. It will be recalled that the tripping switch coil TRS is energized through contacts 6J1 and 5J1 and it remains so energized, permitting the main cam shaft to continue rotating. None of the circuits heretofore described are actuated during this rotation, but during every cycle when contacts CC3 engage and separate, stepping switch brush ISSB is advanced to the next adjacent switch contact. During each of these cycles, the tape is advanced one position through the mechanism. Eventually brush ISSB engages contact ISSC9, at which time a circuit is completed for the sixth justification relay coil 6J to separate contacts 6J1 and 6J4 and to engage contacts 6J2 and 6J3. Contacts 6J1 interrupt the circuit for tripping switch coil TRS to permit restoration of dog 310 to its latching position, wherein it can arrest further cam shaft motion. Contacts 6J2 complete a self holding circuit for coil 6J and contacts 6J3 complete a circuit for stepping switch coil ISS through contacts ISS1, 6J3, ISS2 (an interrupter contact). Contacts 6J4 interrupt the circuit for coil 5J, thereby restoring that relay to normal position. The circuit completed by contacts 6J3 permits switch ISS to self-step until brush ISSB again rests on the home contact ISSCH, at which time contacts ISS1 separate to halt further stepping of the brush. After this sequence has transpired, the time delayed contacts JTD1 finally separate to interrupt the circuits for coils 3J, 4J and 6J. These switches and their contacts return to normal deenergized positions. Separation of contacts 4J1 interrupts the circuit for coil JTD to again engage contacts JTD1. The circuits, however, are all restored to their normal positions as shown.

To summarize what has physically transpired when the justification push-button was depressed, it will be noted that, in the first instance, an "end-of-line" was punched in the tape, the tape was advanced to one position to have a justification signal punched therein, but since normal composition was not taking place and there was in fact no justification to be coded, no signal was punched, the tape was advanced nine positions and then its motion was arrested. The mechanism is now waiting for subsequent information to be introduced for coding.

The operation of an actual machine, the next step in the preparation of a code tape (e. g., one suitable for use in the photocomposing machine disclosed in the aforementioned application S. N. 419,012) is to again depress the justification push-button JP. The circuit sequence operation above traced again takes place with the same results. After this second end-of-line signal is punched in the tape, the tape is ready to receive coded information representing the text material to be photocomposed.

In describing the electrical circuits which are energized during normal composition of a line of text material, only a limited number of functions will be described, that is, it will suffice for an understanding of this invention that a character signal and a space signal be described, as well as a character in the shift position.

It will now be assumed that the first character key depressed will operate code bars to actuate code bar switches 1CB, 3CB, 4CB, 6CB and 8CB to identify the character and code bars 10CB and 11CB to identify the character width. At the same time that these switches, which operate only when a particular key is depressed, are actuated, a universal switch UNS is also actuated. This latter switch is operated every time a key is depressed. Thus engagement of contacts UNS directly complete a circuit for the parallel connected solenoid pulse relays TSP and TSPX. As explained before, these relays are time delayed in operating, that is, contacts on relay TSP will operate five (5) milliseconds after the coil TSP is energized and contacts on relay TSPX will operate twenty-five (25) milliseconds after coil TSPX is energized. It is therefore apparent that, for a period of from five to twenty-five milliseconds after the coils are energized, a circuit for tripping switch coil TRS will be completed through contacts TSPX1 and TSP1 to free dog 310 and permit the main cam shaft to rotate one cycle or one hundred eighty degrees (180°). When relay TSPX operated to separate contacts TSPX1, contacts TSPX2 engaged to complete a circuit from line W1, through contacts UNS, TSPX2, SH2 and contacts 1CBb, rectifier 8RF and interponent actuating magnet coil 8IP, to line W2. Similarly circuits are traced through contacts 3CBb, rectifier 6RF and coil 6IP; contacts 4CBb, rectifier 5RF and coil 5IP; contacts 6CBb, rectifier 3RF and coil 3IP; and contacts 8CBb, rectifier 1RF and coil 1IP. Circuits may also be traced from line W1, through contacts UNS, TSPX2, 10CB and parallel connected coils 11IP and 2W to line W2 and through contacts UNS, TSPX2, 11CB and parallel connected coils 12IP and 3W to line W2. Thus it is seen that, by depressing the finger key, interponent coils 1IP, 3IP, 5IP, 6IP and 8IP are energized in preparation for the punches associated therewith to perforate the tape and give a character identification signal. Also interponent coils 10IP and 11IP are energized in preparation for the punches associated therewith to perforate the tape and give a character width signal. While the interponents are being actuated according to the magnet coils being energized, the main cam shaft is being rotated. The first thing that occurs is that the tape is advanced and then plunger 301 is lifted to perforate the tape to give a code signal representative of the character for the depressed key. After the perforating mechanism is restored to normal position, the interponents are reset preparatory to the next signal being received as a result of the next key depressed.

In addition to the signal itself being coded, the width information is also transmitted to the justification computer mechanism. Code bar switches 9CB, 10CB, 11CB and 12CB are the means by which the width information is utilized in the electrical system. It will be noted that these switches, in addition to completing circuits for interponent actuating magnets 9IP to 12IP, respectively, also complete circuits for width relays 1W to 4W. Considering the assumed conditions set forth above, that is, that the depressed key resulted in the engagement of contacts 10CB and 11CB and thereby completed circuits for second width relay coil 2W and third width relay coil 3W to engage contacts 2W2, 2W4, 2W5, 2W7 and 2W9 and separate contacts 2W1, 2W3, 2W6 and 2W8 and to engage contacts 3W2, 3W4, 3W5, 3W6 and 3W7 and separate contacts 3W1, 3W3 and 3W8, respectively, circuits may be traced to the indexing magnets of the squirrel cage of the justification computer mechanism.

To recapitulate, it will be recalled that the justification mechanism included a squirrel cage mechanism whereby the unit spaces of the various characters and normal interword spaces which go to make up a line of text material are totalized. The squirrel cage included projectable rotor bars which limit the rotation of a shaft to which the rotor is secured in accordance with the width information introduced thereto. In the arrangement disclosed, there are a total of thirteen rotor bars equally spaced around the periphery of the rotor. An extended bar abuts a stop to arrest shaft rotation. The remaining twelve bars are equally spaced around the rotor so that if width information of six unit spaces is introduced, a rotor bar six removed from the previously active bar is extended by energizing the sixth indexing solenoid coil 6E. After this coil is energized and a bar extended thereby, the previously active bar is restored to normal position and the shaft rotated until the newly extended bar strikes the stop. If the next width information indicates a unit width of nine unit spaces, ninth indexing solenoid coil 9E is energized to extend a bar nine removed from the bar previously active i. e. the one projected by solenoid 6E which is now in arrested position. The bar projected by solenoid 6E is then restored to normal position and the shaft rotates until the newly extended bar strikes the stop member. The process continues until the unit spaces for a line of text material are totalized. In the squirrel cage shown, the maximum number of unit spaces which are introduced at one time is twelve, but this is not an inherent limitation, rather it is based on a preferred twelve unit system. In order to provide electrical circuits which can differentiate twelve different circuits, a binary number scheme is resorted to, that is, there is provided a relay having a binary value of one, a relay having a binary value of two, a relay having a binary value of four, a relay having a binary value of eight. These relays are designated 1W, 2W, 3W and 4W respectively. Contacts of the various width relays are selectively connected in a tree circuit so that if relays 1W and 2W are energized, indexing solenoid coil 3E is energized, thereby representing the unit space value three. If it is desired to represent a value of seven, relays 1W, 2W and 3W are energized to complete a circuit for indexing solenoid coil 7E. If the value of ten is considered, relays 2W and 4W are energized to complete a circuit for solenoid coil 10E. With the foregoing examples it is believed that the scheme used may be readily understood.

Returning to the example under consideration, it will be recalled that relays 2W and 3W were assumed energized. These relays represent the binary values two and four or a unit space value of six. Tracing a circuit from line W1, through parallel contacts 2W4 and 3W7, contacts 1SP1, 1W1, 2W2, 3W4 and 4W6, it is seen that coil 6E is energized and the justification computer mechanism is thereby acted upon to project a rotor bar six removed from the one previously extended and in arrested position. Contacts 2W4 and 3W7 also complete a circuit for coil 1SP, but this relay is time delayed in operating and consequently its contacts are not immediately actuated. After a time delay, sufficient for solenoid coil 6E to be energized and a rotor bar extended thereby, contacts 1SP1 separate and contacts 1SP2 and 1SP3 engage. Contacts 1SP1 interrupt the circuit to coil 6E. Contacts 1SP2 complete a self holding circuit for coil 1SP from line W1, through contacts 4SP1, 1SP2 and coil 1SP, to line W2. Contacts 1SP3 complete a circuit for the reset solenoid coil ERS of the squirrel cage to reset the previously extended rotor bar and thus permit rotation of the rotor shaft to totalize the latest introduced width information, the circuit extending from line W1, through contacts 1SP3, 3SP3, 2SP1 and coil ERS to line W2. Contacts 1SP3 also completes a circuit for coil 3SP so that the circuit just traced is almost immediately interrupted. Energization of coil 3SP separates contacts 3SP3 to interrupt coil ERS circuit and engages contacts 3SP1, 3SP2 and 3SP4. Contacts 3SP1 are not effective during this operation but only when a font change is being made. Contacts 3SP2 are also associated with a font change operation and hence will not be now discussed. Contacts 3SP4 directly complete a circuit for coil 4SP to separate contacts 4SP1 and to engage contacts 4SP2 and 4SP3. Contacts 4SP1 interrupt the self holding circuit for coil 1SP. Contacts 4SP2 are associated with a font change operation and will be considered hereafter. Contacts 4SP3 complete a circuit for coil 4F, but it will be noted that a circuit for this coil was completed through contact 4SP3 when the electrical circuits were first connected to the power source and that the coil is self energized at this stage through its own contacts 4F2. The interruption of the circuit for coil 1SP results in the separation of contacts 1SP3 to interrupt the circuit for coil 3SP and thereby separate contacts 3SP4, which in turn deenergizes coil 4SP. Thus the interruption of the self-holding circuit for coil 1SP readies the circuits for the next signal of width information to be introduced as by the depression of a second key on the keyboard unit.

The circuits above described illustrate the circuits employed when a character key is depressed and a coded representation thereof is punched in the tape. Also circuits were described which control the operation of the justification computer mechanism in accordance with width information transmitted thereto. To that limited extent, circuits which are employed during composition of a line have been identified. Circuits will now be described for controlling certain other functions that need to be performed during line composition. One of these other functions concerns coding of a character when the shift key of the keyboard unit is depressed.

Depressing of the shift key engages contacts SHC and thereby directly completes a circuit for shift relay coil SH and shift solenoid SS, the relay coil and the solenoid being connected in parallel. Energization of coil SH results in contacts SH1 engaging and contacts SH2 separating. Energization of the shift solenoid results in the code bars for width information being displaced to their second prescribed position, as previously described.

The effect of the energization of the shift relay will now be considered in relation to the depressing of the character key heretofore considered, that is to say, the finger key which, when depressed, actuated code bar switch contacts 1CB, 3CB, 4CB, 6CB and 8CB. The same circuit operations as before described again take place, but now circuits for the interponent actuating magnet coils are now traced from line W1, through contacts UNS, TSPX2, SH1, MF1, SB3 and the parallel circuits 2CBa, 7RF, 7IP, and 5CBa, 4RF, 4IP, and 7CBa, 2RF, 2IP to line W2. Thus, it is clear that if a finger key is depressed, the code signal for the "unshifted" character will comprise perforations made by punches associated with the interponent magnet coils 1IP, 3IP, 5IP, 6IP and 8IP while the code signal for the "shifted" character will comprise perforations made by punches associated with the complementary interponent magnet coils, that is, coils 2IP, 4IP and 7IP. As a further example, assume that a finger key depressed (shift key not operated) results in the energization of interponent magnet coils 2IP, 4IP, 5IP and 7IP. Then depressing that same finger key and also the shift key results in the energization of magnet coils 1IP, 3IP, 6IP and 8IP. In the description of the composing and coding unit it was noted that when a single character key is depressed, the same character identification code bars are actuated whether or not the shift key is also depressed. Each of these character identification code bars actuates a switch which is a single pole double throw switch, contacts of which may be termed "back" or normally engaged contacts, e. g. 1CBa, and "forward" or normally separated contacts, e. g., 1CBb. When the shift key is not depressed, circuits are traced through the forward contacts of actuated switches whereas when the shift key is depressed circuits are traced through the back contacts of the non-actuated switches.

For purposes of character identification each of the interponent magnet coils 1IP etc., may be thought of as having a binary number value associated therewith. The coil 1IP has the value one assigned thereto; coil 2IP, the value two; coil 3IP, the value four; coil 4IP, the value eight; coil 5IP, the value sixteen; coil 6IP, the value thirty-two; coil 7IP, the value sixty-four, and coil 8IP, the value one hundred twenty-eight. The sum of the binary number values one, two, four, eight, sixteen, thirty-two, sixty-four, and one hundred twenty-eight is two hundred and fifty-five. If we therefore take a number such as one hundred eighty, the complement thereof will be seventy-five. As a further example, the complement of sixty-seven will be one hundred and eighty-eight. The sum of complementary numbers is therefore seen to be two hundred and fifty-five or the sum of all the assigned binary values.

Thus if the code bars for a particular finger key result in the energization of coils 1IP, 3IP, 4IP, 6IP and 8IP, the particular character represented thereby may be considered as having a binary value of one hundred and seventy-three. Actuation of the same finger key together with the shift key results in the energization of complementary coils 2IP, 5IP and 7IP and the character in the shift position therefore has a binary value of eighty-two. From the foregoing, it follows that the binary value of a character in the shift position will be the complement of the binary value of a character in the unshift position.

The width information code bars are shifted when the shift key is depressed and this may result in a width signal different from that above assumed. This simply means that, in place of the assumed code bar switch contacts 10CB and 11CB being engaged, contacts 12CB may be engaged, or in other words, the "shift" character has a set width of eight unit spaces whereas the "unshifted" character had a set width of six unit spaces. It is believed, however, that the circuit explanation for the previously assumed conditions can be applied here to indicate how the new width signal is punched in the tape and how it also is transmitted to the justification computer mechanism to actuate indexing solenoid coil 8E.

The next function to consider is that of depressing the space bar of the keyboard unit, which, as was seen, engages space bar contacts, now designated SBC. Engagement of contacts SBC directly connects space bar relay SB across lines W1—W2 to engage contacts SB1, SB2, SB3, SB4 and SB5. Contacts SB5 complete a circuit to energize the carriage stepper solenoid CSS which advances the justification computer switch carriage 242 one position as previously described. Each time the carriage steps one position, brush STLB is mechanically stepped through a physical connection to the carriage to engage successive contacts STLC, thereby causing the illumination of a space totalizer light to visually indicate the number of interword spaces in a composed line. Contacts SB4 and SB1 complete a circuit from line W1, through contacts SB4, rectifier 2RSF, contacts 1SP1 to indexing magnet 3E and line W2, thus adding three unit spaces to those previously totalized in the justification computer mechanism, three unit spaces being a normal word space. This latter circuit, i. e. contacts SB4 and rectifier 2SRF, also results in the energization of coil 1SP with its attendant results. The cyclic operation of switches 1SP, 3SP, 4SP, which occurs whenever width information is introduced to the squirrel cage indexing solenoids, simply limits the time the solenoid circuits are energized due to the receipt of a single width signal.

Contacts SB4 also complete a circuit through rectifier 1SRF for coils TSP and TSPX. As previously these circuits operate to energize tripping switch coil TRS and permit the main cam shaft to rotate one cycle. Also contacts TSPX2 complete a circuit for the energization of the interponent actuating magnets. Depressing of the space bar results in a signal being transmitted to magnet coil 7IP from line W1, through contacts SB4, rectifier 1SRF, contacts TSPX2, SB2, and coil 7IP to line W2. Thus an interword space signal comprises a single perforation in the tape made by the punch associated with magnet coil 7IP.

In addition to the circuits already described, which cover those utilized when a character in either the shift or unshift position is coded or when an interword space signal is coded, there are various other signals which will be coded in order that sundry photocomposing operations may be automatically performed in accordance with the signals coded in the tape. The push-buttons which are depressed to transmit a signal to the perforator unit are located on the auxiliary keyboard.

After a line is composed on the typewriter, the justification push-button JP is depressed. The same circuits which were heretofore described are then operated in the disclosed manner, that is, an end-of-line signal is perforated in the tape and immediately thereafter, a justification signal is perforated in the tape. Before, the button was depressed when there was no foregoing character signals for a line of text material, and consequently when the justification switches were pivoted in toward the justification drum, they did not encounter any raised surfaces on the drum and hence no justification signal appeared in the tape. Now, however, it is assumed that there will be a justification signal and when the switches are pivoted toward the drum, some of them will be actuated so that when relay 2J is energized a circuit will be traced from line W1, through contacts 2J2 and a combination of switches 1Q to 4Q and 1QR to 5QR, so that a combination of interponent magnet coils 1IP to 9IP will be energized to result in the recording of a justification signal in the tape. As before, immediately following the justification signal the tape will be advanced through the perforator mechanism nine positions without any signal being entered thereon.

The remaining signals will be divided into two categories and each category separately considered. It is believed that, in view of the foregoing circuit descriptions, a general treatment of the signals will suffice. In the first category to be considered are the width information signals which result from depressing one of the push-buttons 1USP, 2USP, TSP, NSP and MSP which respectively signal one unit space, two unit spaces, a thin space (three unit spaces) an en space (six unit spaces) and an em space (twelve unit spaces).

First to be considered is one unit space push-button 1USP which when depressed completes a circuit for first unit space relay 1US to engage contacts 1US1, 1US2 and 1US3. Contacts 1US1 directly completes a circuit for interponent actuating magnet coil 13IP. Contacts 1US2 and 1US3 complete a circuit for second indexing solenoid coil 1E from line W1, through contacts 1US2, 1SP1, and 1US3 and coil 1E to line W2. A circuit for coil 1SP is also completed by the engagement of contacts 1US2. Relay 1SP and relays 3SP and 4SP operated in turn thereby limit the time during which the width information is supplied to the squirrel cage indexing solenoid coils circuits. It is apparent that the width information represented by push-button 1USP being depressed is added to previously totalized information in the justification computer unit. It is further apparent that the depressing of button 1USP did not result in the energization of coils TSP and TSPX to advance the tape in the perforator unit. Hence, unit space signals are coded adjacent to another signal and in line therewith. Thus if it is desired to unit space two characters, the operator depresses the key for the first character, then the unit space key and then the key for the second character. The unit space signal will appear opposite the signal for the second character. Depressing button 2USP has results similar to those just outlined except that magnet coil 14IP is energized and indexing solenoid coil 2E is energized.

Depressing thin space push-button TSP directly energizes thin space relay coil TS to engage contacts TS1, TS2 and TS3. Contacts TS3 complete a circuit for coil MF to separate contacts MF1 and engage contacts MF2. Engagement of contacts MF2, together with contacts TS3 complete a circuit for coils TSP and TSPX, thereby freeing the cam shaft for one cycle of rotation as previously described. Engagement of contacts TSPX2 completes a circuit for the parallel circuits of contacts TS1, coils 1W and 12IP and contacts TS2, coils 2W and 11IP. It is thus seen that when the thin space push-button is depressed, the main cam shaft is rotated one cycle to advance the film, the signal is punched in the tape by itself, and the information is transmitted to the indexing solenoid 3E to add three unit spaces to totalized unit spaces. In a similar manner which is now readily apparent, push-buttons NSP and MSP (for an en space and an em space respectively) will cause signals therefor to be coded in the tape and will appropriately actuate the squirrel cage rotor so that six and twelve unit spaces are added to the justification computer.

The second category of signals will generally be termed "machine function" signals, and they will comprise the signals for line erase, stop machine and quad left. When it is desired to quad a line, after the line has been composed, the quad left push-button is depressed to directly connect quad left relay QL to lines W1 and W2 and contacts QL1, QL2, QL3, QL4 and QL5 therefore engage. Contacts QL5 complete a circuit for coil MF to separate contacts MF1 and engage contacts MF2, the latter of which completes a circuit for coils TSP and TSPX to free the main cam shaft for a single cycle or half rotation. Separation of contacts MF1 prevents a circuit from being established for the interponent magnet coils through the back contacts 1CBa etc. After contacts TSPX2 engage, a circuit for coil 8IP can be traced through contacts QL2 and rectifier 8RFb, while a circuit for coil 6IP can be traced through contacts QL3 and rectifier 6RFb, and a circuit for coil 5IP can be traced through contacts QL4 and rectifier 5RFb. Thus it is seen that a quad left signal comprises perforations made by the punches associated with the coils 5IP, 6IP and 8IP. Quite similarly, the signal for line-erase comprise a tape perforation made by the punch associated with coil 8IP, and the stop machine signal comprises tape perforations made by the punches associated with coils 5IP and 6IP. The first contacts of the various function relays i. e. contacts QL1, LE1 and SM1, each directly complete a circuit for the first justification relay coil 1J to initiate a justification circuit sequence operation which was described above. During this circuit sequence, the justification switches 1Q to 4Q and 1QR to 5QR are pivoted in toward the surface of the justification drum, and consequently some of them will probably be operated. The signal thus obtained, after a quad left, line erase, push-button is depressed will be "meaningless" and provision is made in the photographing unit for ignoring it.

Another machine function to be considered is that of a font change. It was pointed out at the beginning of the electrical circuit description that a "home" or normal font signal is entered on the tape so that photographing a particular type face normally take place. Often it is desired to change a font to provide, for example, italics or bold face type. It is therefore desirable to provide signals representative of the various fonts on a font plate. The font selection pushbutton FI, FII, FIII and FIV are such that they may be momentarily held in actuated position or they may be locked in actuated position. It will be assumed that font push-button FI is depressed to complete a circuit for first font relay 1F, from line W1, through contacts FIa, 2F1 and coil 1F to line W2 and thereby engage contacts 1FI, 1F2 and 1F3. Contacts FIa also complete a circuit for ribbon shift solenoid coil RS, the purpose of which is to shift the typewriter ribbon so that the typewritten proof copy of the text material appears in print of a different color as a visual indication that a font other than the normal one is selected for photographing. Contacts FIb interrupt the circuit for coil 4F, thereby restoring the relay to normal deenergized position. Contacts 1F1 complete a circuit directly for coil 2SP to separate contacts 2SP1 and a circuit through rectifier SRF for coil 1SP which immediately begins the cycle of operations for coils 3SP and 4SP. The circuit for solenoid coil ERS is prevented from being energized by the separation of contacts 2SP1. A circuit for the tripping switch coil TRS is completed through contacts 3SP1 and 1F2 to permit the main cam shaft to rotate for one cycle. A circuit for the interponent actuating magnet coils is completed from line W1, through contacts 3SP2, 1F3 and the parallel circuits of contacts FIc, rectifier 6RF, coil 6IP and contacts FId, rectifier 7RF, coil 7IP, to line W2. Thus the signal representing font I comprises perforations in the tape by punches associated with the magnet coils 6IP and 7IP. In the circuit sequence, while the button FI remains depressed, contacts 4SP2 complete a circuit for coil 2F which becomes self holding through contacts 2F2. Contacts 2F1, which separate, interrupt the circuit for coil 1F to restore its contacts to normal position. The circuits remain as thus described until button FI is released, in which case circuits are established, as heretofore disclosed, for a "home" font signal to appear in the tape.

It is apparent that the above circuits could also have been traced had either of the other buttons FII, FIII or FIV been depressed to give a signal for one of the other fonts. It is shown in Figure 29 that the signal for font II comprises perforations made by the punches associated with magnet coils 6IP, 7IP and 8IP and that the signal for font III comprises perforations made by the punches associated with magnet coils 5IP and 7IP, whereas the signal for font IV comprises perforations made by the punches associated with magnet coils 5IP and 8IP.

Operation

In operation, the preparation of a tape coded to represent composed text material takes place in response to keyboard operation. Upon connecting the apparatus to a source of electrical power, a signal is immediately coded on the tape representative of a "home" font or the font which is normally in photographic position. Thereafter, the operator depresses a justification push-button which enters an end-of-line signal on the tape in the position immediately following the original font signal. The tape advances through the perforator mechanism an arbitrary, but fixed, distance and then its motion is arrested. The operator again depresses the justification push-button with similar results. That is, an end-of-line signal is entered on the tape and the tape again advances through the perforator mechanism the same fixed distance and halts. These operations are preliminary to the coding of text material and, in the case of the font signal, it is simply an expedient to eliminate the necessity for the operator to select the font which is normally used to record the text material in the photographing unit. In the case of the successive spaced apart end-of-line signals, they serve as a convenient means for synchronizing the tape advance in the output or photographing unit. This will be clear from the aforementioned co-pending application devoted to the output or photographing unit.

The operator then begins the typing of the text material and as each character key is depressed a coded signal appears on the coded tape; signals representative of the interword spaces also appear in response to actuation of the keyboard space bar. The signals, of course, follow one another in the same order in which the operator actuates the keyboard. Character signals follow one another until the visual means on the justification mechanism (i. e. pointer 184 and interword space totalizing lights 237) indicate that a line is completed and can be justified, whereupon the operator depresses the jusification button. Pressure on this button enters an end-of-line signal on the tape followed by a justification signal and a number of blank positions caused by the automatic advance of the tape through the perforator mechanism. If the line being composed is the last line of a paragraph, the operator, instead of depressing the justification button, depresses the quad-left button to enter a quad-left signal. This signal follows the last character signal and in turn is followed by a signal caused by operation of justification switches and the fixed number of blank spaces. The signal following the quad signal is meaningless and is ignored in the photographing unit. It is not eliminated from the coded tape because to do so would unduly complicate the electrical circuits. It is a simpler matter to bypass the signal in the photographing unit. The foregoing outlines the operator's part in coding a simple paragraph of straight text material. While the paragraph composed as above would not have the first word thereof indented, that is a simple condition to provide for by merely depressing the thin space, en space, or em space buttons prior to the actuation of the character keys.

Certain machine functions may be coded so that they are performed automatically in the photographing unit. For example, if it is desired that certain portions of the composed material be photographed from a font comprising characters of a different type face or style, the operator depresses a font selection button before typing the characters which are to be recorded in the different face. As long as this font button is depressed, succeeding characters will be photographed from the font associated therewith. When the button is released, the signal for the "home" font is again entered on the tape so that all subsequent characters coded will be photographed from the "home" font.

It may happen that, as the operator is typing the text material and thereby entering coded information on the tape, he may note from his typewritten proof copy that an error has been made. In such case, he immediately depresses the line-erase push-button to enter a line-erase signal on the tape. This signal is immediately followed by a meaningless justification signal and the fixed number of blank spaces. This line erase signal will, in the photographing unit, cause that portion of the tape containing the line in error to be rapidly stepped through the unit without recording the line. The line will, however, be typed over and recoded in its entirety.

Another machine function signal, which is that of "stop machine," may also be coded on the tape. This signal when it appears in the photographing unit automatically stops further recording of text material and arrests operation of the machine in order that some operation may be performed, such as changing the lens system to provide a different point size in the recorded text. Thus the operator of the input or composing unit will, when he comes to the end of text material which is to be photographically reproduced in one point size and followed by text material recorded in another point size, depress the stop machine button to enter a corresponding signal on the tape.

It is apparent from the foregoing that an operator can code any signal on the tape which is representative of any function which he might want performed in the photographing unit.

It is not intended to set forth all the variations that may be made, but it is contemplated that many of the features of the invention disclosed may be carried out in other ways and may be used in connection with apparatus and circuits different from those specifically described and that many widely different embodiments of the invention can be made without departure from the spirit and scope of the invention. Thus it may be desirable to employ an electrical keyboard rather than the one disclosed, or a different type justification computer mechanism or tape perforator unit may be used. It is therefore intended that all matter contained in the above description or shown in the accompanying drawings shall be interpreted as illustrative and not in a limiting sense.

We claim:

1. In a machine for producing a coded tape having a succession of code signals thereon representative of a justified composed line of type characters which vary in set widths on a unit basis, the combination of a keyboard comprising a series of character keys and a word space key, and a justification information computer responsive to the actuation of said keys for totalizing the number of units represented by the combined widths of the characters and word spaces in the unjustified composed line, subtracting that total from the full number of units represented by the justified line, and then apportioning the remaining units among the word spaces, said computer comprising a rotary drum having code elements arranged thereon in column and row formation to produce a justification signal representing a quotient and a quotient remainder derived by dividing the number of remaining units in the unjustified line by the number of word spaces in the line, together with a signal producing mechanism responsive to the code elements of the rotary drum to produce a corresponding justification code signal in the coded tape.

2. A justification information computor according to claim 1, wherein the code elements for the quotient are arranged in one plurality of groups, and those for the quotient remainder arranged in a second plurality of groups.

3. A justification information computor according to claim 2, wherein the quotient groups of code elements as well as the quotient remainder groups of code elements have code values based on the binary number system.

4. A justification information computor according to claim 2, wherein the number of columns of code elements in the respective groups corresponds to the number of word spaces which may occur in the composed line.

5. A justification information computor according to claim 4, wherein the number of rows of code elements in the respective groups corresponds to the number of units which may remain in an unjustified line.

6. A combination according to claim 1, wherein the code elements are in the form of raised surfaces on the drum.

7. A combination according to claim 1, including means for rotating the drum different unit distances in accordance with unit variations in set widths of the type characters being composed.

8. A combination according to claim 1, including means for rotating the drum a definite unit distance in accordance with the normal set width of the word spaces in the composed line.

9. A combination according to claim 1, including means for rotating the drum different unit distances in accordance with unit variations in set widths of the type characters being composed and a definite unit distance in accordance with the normal set width of the word spaces in the composed line.

10. A combination according to claim 1, including code reading elements cooperating with the drum to transmit the justification information to the signal producing mechanism.

11. A combination according to claim 10, wherein the code reading elements are in the form of electrical switches actuated by the active code elements on the drum.

12. A combination according to claim 11, including a keyboard justification key, and means controlled by said key for causing the actuation of the electrical switches after the line has been composed.

13. A combination according to claim 1, including code reading elements to transmit the justification information to the signal producing mechanism, said elements being in the form of electrical switches actuated by the active code elements on the drum, there being one such switch for each group of code elements, a keyboard justification key, and means controlled by said key for causing the actuation of said switches after the line has been composed.

14. A combination according to claim 13, wherein the electrical switches are mounted on a carriage movable lengthwise of the drum and which advances the switches from one column of code elements to the next in the respective groups each time the word space key is actuated.

15. A combination according to claim 1, including means for restoring the drum to its original start-of-line position after the composition of each line.

16. A combination according to claim 15, including means for setting the drum in different start-of-line positions according to the length of the line to be composed.

17. A combination according to claim 14, including means for restoring the switch carriage to its original start-of-line position after the composition of each line.

18. A combination according to claim 1, including a rotary indicator coupled to the rotary drum and indicating the length of the line to be composed.

19. A combination according to claim 1, including an indicator controlled from the word space key and indicating the number of word spaces in the unjustified line.

20. A combination according to claim 19, wherein the word space indicator comprises a series of lamps, and electrical means for illuminating the lamps one after another as the word space key is actuated.

21. A combination according to claim 1, including a combined line indicator and space indicator cooperating with the rotary drum to guide the operator in composing a justifiable line.

22. A combination according to claim 21, wherein the combined indicator comprises a rotary pointer coupled to the rotary drum and playing over two scales, one calibrated to indicate the length of the line to be composed, and the other the number of units remaining in the unjustified line.

23. A combination according to claim 22, including means for setting the pointer in different start-of-line positions according to the length of the line to be composed.

24. In a machine for producing a coded tape having a succession of code signals thereon representative of a justified composed line of type characters which vary in set widths on a unit basis, the combination of a keyboard comprising a series of character keys and a word space key, a rotary justification information computer drum, means acting in response to the actuation of the keys for rotating the drum different unit distances in accordance with unit variations in set widths of the type characters and word spaces being composed, said drum having a series of rows of code elements spaced apart in a circumferential direction on a unit basis and also having a series of columns of code elements spaced apart in an axial direction on a word space basis, the code elements in row formation being arranged in a plurality of groups having different quotient values as between the groups and corresponding in number in the respective groups to the number of units which may remain in an unjustified line, and the code elements in column formation being arranged in a plurality of groups and having different quotient remainder values as between the groups and corresponding in number to the number of word spaces which may occur in a composed line, decoding mechanism cooperating with the computer drum and presenting as many code reading elements as there are different groups of code elements on the drum, a movable carriage on which the code reading elements are mounted and which is movable axially of the computer drum, means responsive to each actuation of the word space key for effecting movement of the carriage for a distance of one column, means operable after the composition of a line for activating the code reading elements located at the time in cooperative relation to the active code elements on the drum as determined by the group, row and column arrangement of said code elements, and signal producing mechanism acting in response to the code reading elements to produce corresponding justification signals in the coded tape.

References Cited in the file of this patent

UNITED STATES PATENTS

| | | |
|---|---|---|
| 944,405 | Bancroft et al. | Dec. 28, 1909 |
| 1,094,629 | Bancroft et al. | Apr. 28, 1914 |
| 1,489,535 | Lebeis | Apr. 8, 1924 |
| 1,791,950 | Bryce | Feb. 10, 1931 |
| 1,884,743 | Kleinschmidt | Oct. 25, 1932 |
| 1,988,943 | Griffith | Jan. 22, 1935 |
| 2,000,029 | Kleinschmidt et al. | May 7, 1935 |
| 2,021,419 | Kleinschmidt et al. | Nov. 19, 1935 |
| 2,161,564 | Fitch et al. | June 6, 1939 |
| 2,285,206 | Indahl | June 2, 1942 |
| 2,346,268 | Mills et al. | Apr. 11, 1944 |
| 2,390,413 | Ayres | Dec. 4, 1945 |
| 2,453,782 | Chisholm | Nov. 16, 1948 |
| 2,540,027 | Dodge | Jan. 30, 1951 |
| 2,654,812 | Cunningham et al. | Oct. 6, 1953 |